(12) United States Patent
Kendall et al.

(10) Patent No.: US 11,999,115 B2
(45) Date of Patent: Jun. 4, 2024

(54) APPARATUS AND METHOD FOR PROCESSING A COMPOSITE STRUCTURE

(71) Applicant: The Boeing Company, Chicago, IL (US)

(72) Inventors: James R. Kendall, Mount Pleasant, SC (US); Byron James Autry, Charleston, SC (US); Santiago M. Mejia, Frazier Park, CA (US); Brian T. Peters, Mount Pleasant, SC (US); Brian S. Carpenter, Summerville, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/701,849

(22) Filed: Mar. 23, 2022

(65) Prior Publication Data
US 2022/0332060 A1 Oct. 20, 2022

Related U.S. Application Data

(60) Provisional application No. 63/174,631, filed on Apr. 14, 2021.

(51) Int. Cl.
*B29C 70/34* (2006.01)
*B29C 70/54* (2006.01)
*B29L 31/30* (2006.01)

(52) U.S. Cl.
CPC ............ *B29C 70/342* (2013.01); *B29C 70/54* (2013.01); *B29L 2031/3076* (2013.01)

(58) Field of Classification Search
CPC .............................. B29C 70/34; B29C 70/342
See application file for complete search history.

(56) References Cited

U.S. PATENT DOCUMENTS

| 5,354,195 | A | 10/1994 | Dublinski et al. |
| 8,684,343 | B2 | 4/2014 | Hiken et al. |
| 10,293,519 | B2 | 5/2019 | Ingram, Jr. et al. |
| 10,479,066 | B2 | 11/2019 | Thomas |

(Continued)

FOREIGN PATENT DOCUMENTS

| CA | 2787188 A1 * | 2/2013 |
| CN | 110920101 | 3/2020 |

(Continued)

OTHER PUBLICATIONS

European Patent Office, Extended European Search Report, App. No. 22165875.0 (dated Sep. 5, 2022).

(Continued)

*Primary Examiner* — Jeffry H Aftergut
(74) *Attorney, Agent, or Firm* — Walters & Wasylyna LLC

(57) ABSTRACT

An apparatus for processing a composite structure includes a mandrel that includes a tooling surface and vacuum bagging that includes an elastomeric membrane and a bagging surface. The apparatus also includes a surface interface formed between the mandrel and the elastomeric membrane. The surface interface includes a suction channel formed in at least one of the tooling surface of the mandrel and the bagging surface of the elastomeric membrane. The elastomeric membrane is configured to be sealed to the mandrel along the suction channel in response to a vacuum applied to the suction channel.

20 Claims, 16 Drawing Sheets

(56) References Cited

U.S. PATENT DOCUMENTS

2010/0291258 A1* 11/2010 Dull ................. B29C 70/44
                                              425/405.2
2014/0096903 A1*  4/2014 Stephens ........... B29D 99/0014
                                              156/382
2020/0070443 A1*  3/2020 Sana .................. B29C 70/54

FOREIGN PATENT DOCUMENTS

FR      2 846 276       4/2004
GB       2316036 A   *  2/1998

OTHER PUBLICATIONS

European Patent Office, Partial European Search Report, App. No. 23205797.6 (Feb. 20, 2024).

* cited by examiner

APPARATUS AND METHOD FOR PROCESSING A COMPOSITE STRUCTURE

PRIORITY

This application claims priority from U.S. Ser. No. 63/174,631 filed on Apr. 14, 2021.

FIELD

The present disclosure relates generally to composite materials and, more particularly, to apparatuses and methods for processing composite structures.

BACKGROUND

Composite structures are typically processed within an autoclave that applies heat and pressure to the structure or in an oven that applies heat to the structure. However, there are several disadvantages to conventional autoclave and oven processing techniques, particularly when processing large composite structures, such as aircraft structures. For example, conventional processing techniques often require application of consumable materials, such as bagging and seal bonding agents, which increases cost and cycle time.

Accordingly, those skilled in the art continue with research and development efforts in the field of composite processing and, as such, apparatuses and methods intended to address the above-identified concerns would find utility.

SUMMARY

The following is a non-exhaustive list of examples, which may or may not be claimed, of the subject matter according to the present disclosure.

Disclosed are apparatuses for processing composite structures.

In an example, a disclosed apparatus for processing a composite structure includes a mandrel including a tooling surface, configured to support a composite layup. The apparatus also includes a vacuum-bag assembly configured to be placed over the mandrel. The vacuum-bag assembly includes a caul, including a perimeter edge, and vacuum bagging, extending from the perimeter edge of the caul and including a bagging surface. The apparatus further includes a vacuum channel formed in at least one of the tooling surface of the mandrel and the bagging surface of the vacuum bagging. A vacuum seal is formed between the vacuum bagging and the mandrel along the vacuum channel when the vacuum bagging is placed over the mandrel and a vacuum applied to the vacuum channel. The mandrel, the vacuum-bag assembly, and the vacuum seal form a sealed vacuum chamber that encloses the composite layup.

Also disclosed are mandrels for processing composite structures.

In an example, a disclosed mandrel for processing a composite structure includes a tooling surface on which a composite layup is configured to be supported and a mandrel vacuum channel formed in the tooling surface. A vacuum seal is formed between the tooling surface and an edge portion of a vacuum-bag assembly, placed over the composite layup and the mandrel, in response to a vacuum applied to the mandrel vacuum channel. A sealed vacuum chamber that encloses the composite layup is formed by the mandrel, the vacuum-bag assembly, and the vacuum seal.

Also disclosed are vacuum-bag assemblies for processing composite structures.

In an example, a disclosed vacuum-bag assembly for processing a composite structure includes a caul that includes a perimeter edge and that is configured to be applied to a composite layup supported by a mandrel. The vacuum-bag assembly also includes an elastomeric membrane that is coupled to the caul and that extends from the perimeter edge of the caul. The elastomeric membrane includes a bagging surface and is configured to be applied to the mandrel. The vacuum-bag assembly further includes a bagging suction channel formed in the bagging surface. A vacuum seal is formed between a tooling surface of the mandrel and the elastomeric membrane in response to a vacuum applied to the bagging suction channel. A sealed vacuum chamber that encloses the composite layup is formed by the vacuum-bag assembly, the mandrel, and the vacuum seal.

Also disclosed are methods for processing composite structures.

In an example, a disclosed method for processing a composite structure includes steps of: (1) supporting a composite layup on a tooling surface of a mandrel; (2) positioning a caul of a vacuum-bag assembly over the composite layup; (3) draping vacuum bagging of the vacuum-bag assembly, extending from a perimeter edge of the caul, over a portion of the tooling surface; (4) applying a vacuum to a vacuum channel formed in at least one of the tooling surface of the mandrel and a bagging surface of the vacuum bagging; (5) forming a vacuum seal between the tooling surface of the mandrel and the bagging surface of the vacuum bagging and along the vacuum channel; and (6) forming a sealed vacuum chamber that encloses the composite layup with the mandrel, the vacuum-bag assembly, and the vacuum seal.

Other examples of the disclosed systems, apparatuses, and methods will become apparent from the following detailed description, the accompanying drawings, and the appended claims.

DETAILED DESCRIPTION

Figure 1:
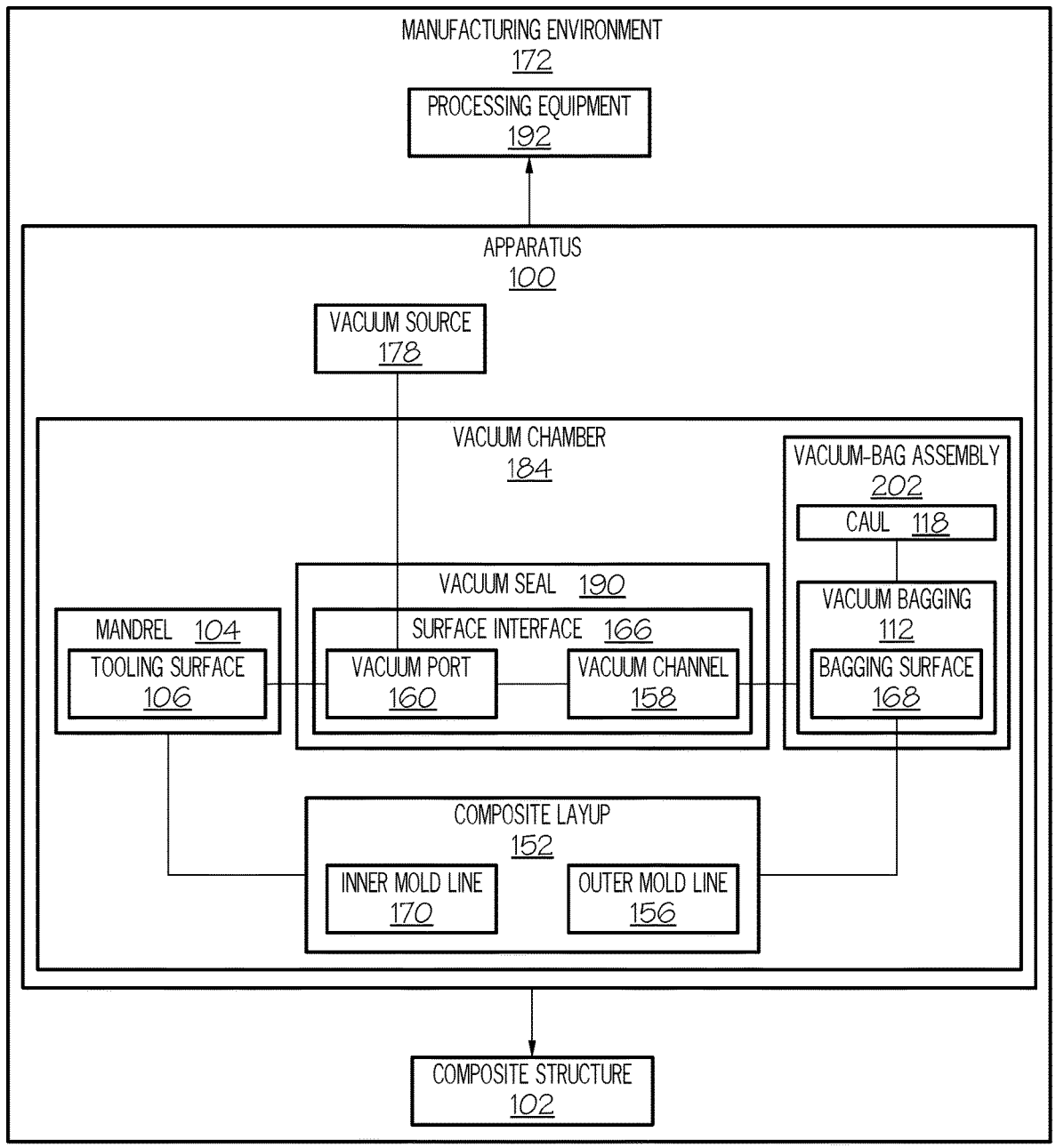
FIG. 1 is a schematic block diagram of an example of an apparatus for processing a composite structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring generally to FIGS. 1-22, by way of examples, the present disclosure is directed to an apparatus 100 for processing a composite structure 102. The apparatus 100 generally includes a mandrel 104 and a vacuum-bag assembly 202. The mandrel 104 is configured to support a composite layup 152. The vacuum-bag assembly 202 is configured to drape over and conform to at least a portion of the mandrel 104 such that the composite layup 152 is located between the mandrel 104 and the vacuum-bag assembly 202. The mandrel 104 and the vacuum-bag assembly 202 are configured to form a sealed vacuum chamber 184 around the composite layup 152 during any one of a variety of processing operations used to make the composite structure 102.

It should be recognized that for the purpose of the present disclosure, the composite layup 152 refers to an uncured and/or unhardened composite preform prior to processing (e.g., via autoclave). It should also be recognized that for the purpose of the present disclosure, the composite structure 102 refers to a cured and/or hardened composite post processing (e.g., via autoclave). In other words, the composite structure 102 is a cured and/or hardened product produced by processing the composite layup 152.

FIG. 1 schematically illustrates a manufacturing environment 172 for processing the composite layup 152 to make the composite structure 102. FIG. 1 schematically illustrates a post processing and post demold situation for the composite structure 102 in which the composite structure 102 is removed from the mandrel 104.

Figure 2:
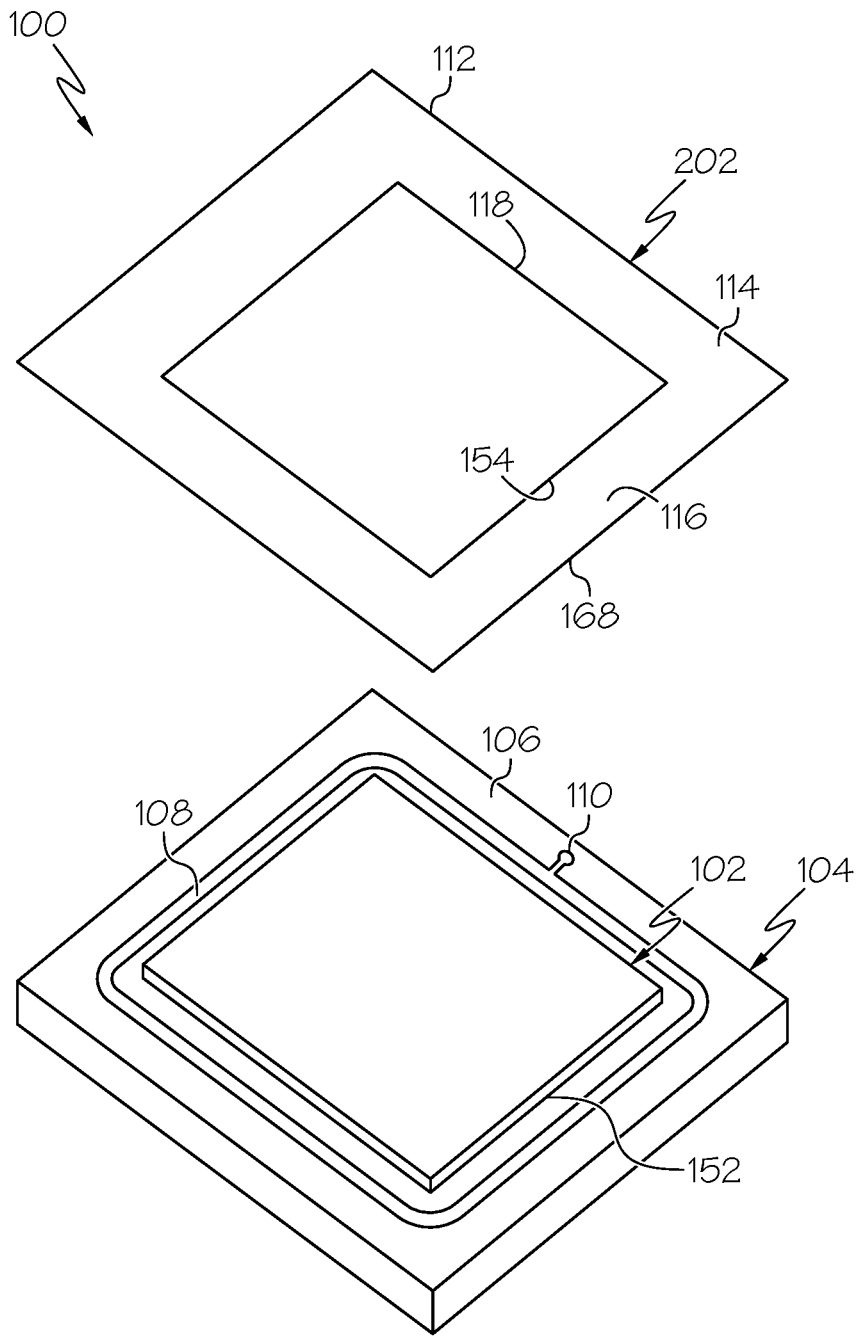
FIG. 2 is a schematic, perspective view of an example of the apparatus for processing the composite structure.
Figure 3:
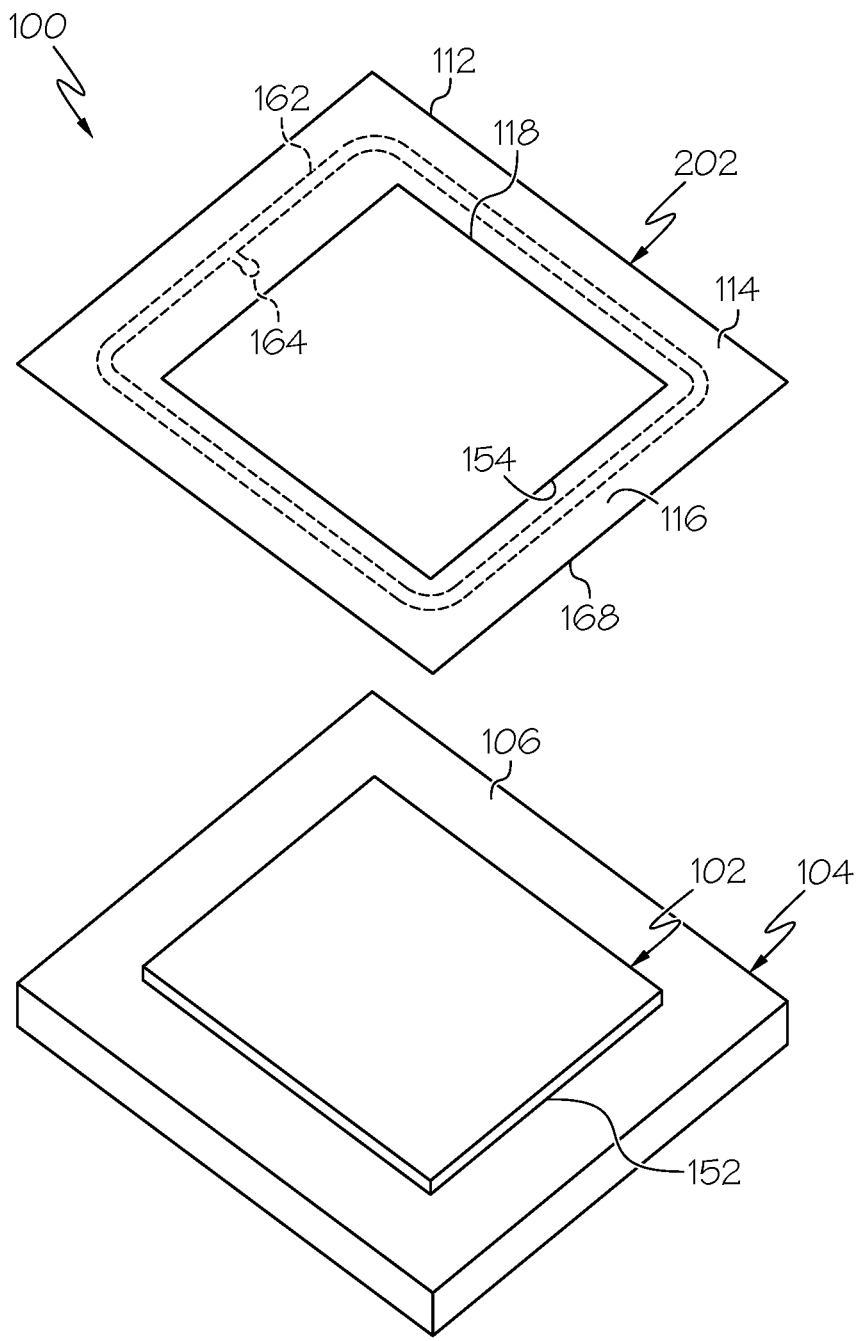
FIG. 3 is a schematic, perspective view of an example of the apparatus for processing the composite structure.

FIGS. 2-3 schematically illustrate a processing situation for the composite layup 152 in which the composite layup 152 is located upon the mandrel 104 to be covered by the vacuum-bag assembly 202 (e.g., the vacuum-bag assembly 202 is shown separated from the mandrel 104 and the composite layup 152 in FIGS. 2 and 3).

FIGS. 4-6 and 9-20 schematically illustrate a processing situation for the composite layup 152 in which the composite layup 152 is located upon the mandrel 104 and is covered by the vacuum-bag assembly 202 and in which a vacuum seal 190 is formed between the mandrel 104 and the vacuum-bag assembly 202 to form a sealed vacuum chamber 184 around the composite layup 152.

In one or more examples, the apparatus 100 is used during a resin infusion operation, in which a resin matrix is infused through the composite layup 152 (e.g., a dry preform) that is supported and sealed by the apparatus 100. In one or more examples, the apparatus 100 is used during a compacting operation, in which compacting pressure is applied to the composite layup 152 (e.g., a wet layup) that is supported and sealed by the apparatus 100. In one or more examples, the apparatus 100 is used during a debulking operation, in which at least one of low to moderate debulking heat and low to moderate debulking pressure are applied to the composite layup 152 that is supported and sealed by the apparatus 100. In one or more examples, the apparatus 100 is used during a curing operation, in which at least one of moderate to high curing heat and moderate to high curing pressure are applied to the composite layup 152 that is supported and sealed by the apparatus 100. In one or more examples, the apparatus 100 may be used with processing equipment 192, such as an autoclave, an oven, a heat blanket, or a heat lamp, to apply at least one of heat and pressure.

Referring to FIGS. 1-8, in one or more examples, the mandrel 104 is configured to support the composite layup 152. The vacuum-bag assembly 202 is configured to be applied over the composite layup 152. The mandrel 104 and the vacuum-bag assembly 202 are configured to be sealed to each other around the composite layup 152 along a surface interface 166 (FIGS. 1, 4 and 5), between a portion of the mandrel 104 and a portion of the vacuum-bag assembly 202. Sealing the mandrel 104 and the vacuum-bag assembly 202 together forms the vacuum seal 190 (FIGS. 1, 4 and 5) between the mandrel 104 and the vacuum-bag assembly 202. The vacuum seal 190 forms (or defines) a perimeter of the sealed vacuum chamber 184 (FIGS. 1, 4 and 5), formed by the mandrel 104 and the vacuum-bag assembly 202, around the composite layup 152 such that a compressive force can be applied to the composite layup 152 during processing.

As used herein, the terms "seal," "sealed," "sealing," and similar terms generally refer to a hermetic seal. As can be appreciated, while a truly hermetic seal is often desirable in many implementations, a substantially airtight seal may be sufficient in some implementations. Accordingly, the seals described herein provide a suitable level of sealing for the concerned implementation, but which is not strictly limited to a truly hermetic seal.

In an example, the mandrel 104 is configured to shape an inner mold line 170 (IML) (FIG. 1) of the composite layup 152 and, thus, shape an inner surface (inner mold line) of the composite structure 102. In these examples, the vacuum-bag assembly 202 is applied to an outer mold line 156 (OML) (FIG. 1) of the composite layup 152 and is configured to shape the outer mold line 156 of composite layup 152 and, thus, an outer surface (outer mold line) of the composite structure 102.

In another example, the mandrel 104 is configured to shape the outer mold line 156 (FIG. 1) of the composite layup 152 and, thus, shape the outer surface (outer mold line) of the composite structure 102. In these examples, the vacuum-bag assembly 202 is applied to the inner mold line 170 (FIG. 1) of the composite layup 152 and is configured to shape the inner mold line 170 of composite layup 152 and, thus, the inner surface (inner mold line) of the composite structure 102.

Referring to FIGS. 1-7, the mandrel 104 is any suitable tooling that is configured to form the composite structure 102. The mandrel 104 is made of any suitable material. The mandrel 104 has any one of various shapes, dimensions, or complexities depending upon the composite structure 102 (e.g., part or component) being made. The mandrel 104 includes a tooling surface 106 on which the composite layup 152 is configured to be supported.

In one or more examples, the tooling surface 106 has a contour that mirrors or is complementary to the inner mold line 170 (FIG. 1) of the composite layup 152 and, thus, of the composite structure 102. In one or more examples, the tooling surface 106 has a contour that mirrors or is complementary to the outer mold line 156 (FIG. 1) of the composite layup 152 and, thus, of the composite structure 102.

In one or more examples, the tooling surface 106 of the mandrel 104 is substantially planar (e.g., flat) (e.g., as shown in FIGS. 2-5). In these examples, the mandrel 104 is used to form the composite structure 102 that is substantially planar or that has a substantially planar surface, such as, but not limited to, a composite panel or a composite spar or stringer of an aircraft.

Figure 6:
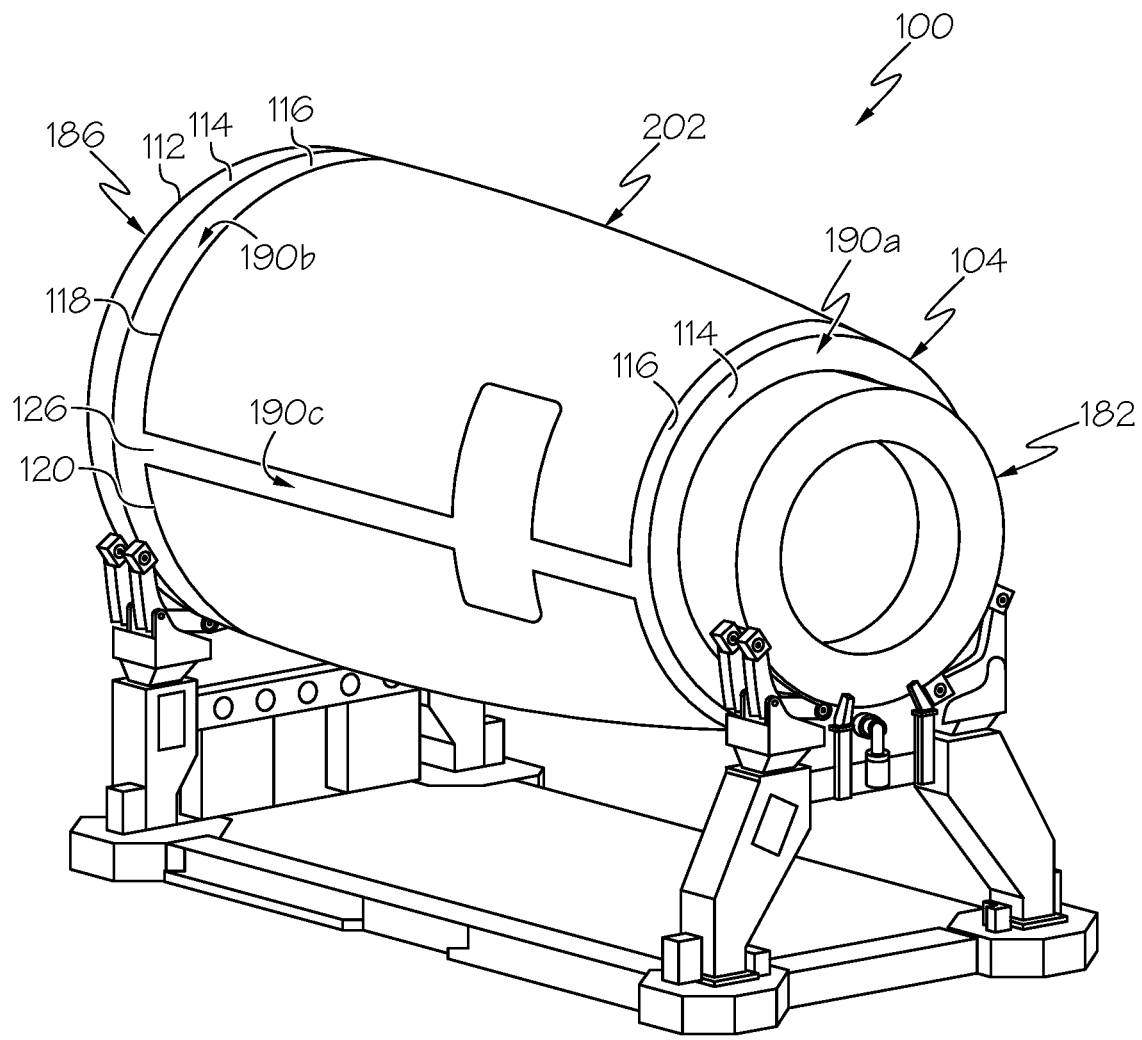
FIG. 6 is a schematic, perspective view of an example of the apparatus.
Figure 7:
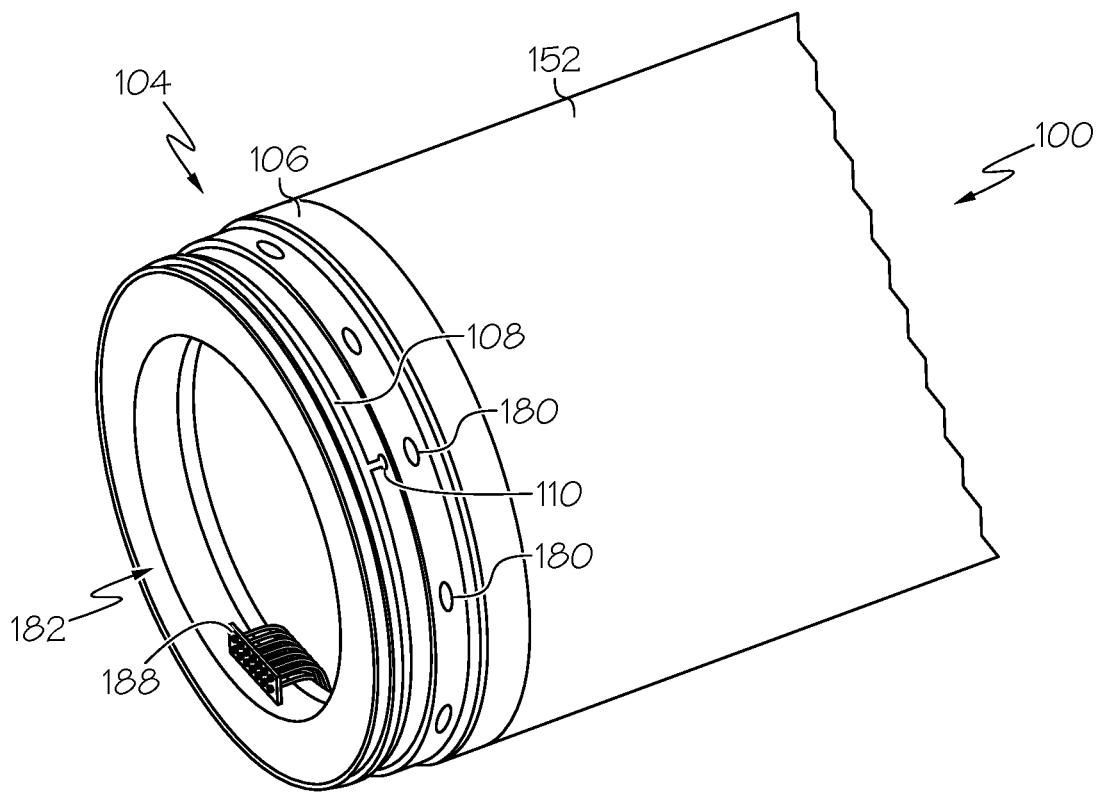
FIG. 7 is a schematic, perspective view of an example of a portion of a mandrel of the apparatus.

In one or more examples, the tooling surface 106 of the mandrel 104 is cylindrical (e.g., as shown in FIGS. 6 and 7). In these examples, the mandrel 104 used to form the composite structure 102 that has a generally cylindrical or tubular shape, such as, but not limited to, a section of a composite barrel of an aircraft fuselage. In one or more examples, the tooling surface 106 of the mandrel 104 may have other curvatures in one or more directions or other closed cross-sectional shapes (not explicitly illustrated).

Referring to FIGS. 1-6 and 8, in one or more examples, the vacuum-bag assembly 202 includes vacuum bagging 112 and a caul 118. The caul 118 is coupled to the vacuum bagging 112. In one or more examples, the caul 118 serves as the primary processing surface of the vacuum-bag assembly 202 that covers an entirety of the composite layup 152 and the vacuum bagging 112 is integrated with the caul 118 and extends from the perimeter edge 154 of the caul 118 to create a vacuum closeout while facilitating for drapability of the vacuum-bag assembly 202 (e.g., the vacuum bagging 112) over complex and/or dynamic features of the mandrel 104.

The caul 118 and the vacuum bagging 112 are coupled together via any suitable method or technique. In one or more examples, contact and bonding between the caul 118 and the vacuum bagging 112 occurs at an edge interface, such as along a perimeter edge 154 of the caul 118. In these examples, a portion of the vacuum bagging 112 overlaps (e.g., covers) a portion of the caul 118, such as, at the edge interface. In one or more examples, contact and bonding between the caul 118 and the vacuum bagging 112 occurs over an entirety of the caul 118. In these examples, the vacuum bagging 112 completely overlaps (e.g., covers) the caul 118.

The illustrative examples depict the vacuum-bag assembly 202 as including both the vacuum bagging 112 and the caul 118. However, in other examples, the caul 118 is not required for processing the composite layup 152 to form the composite structure 102. As such, in one or more examples, the vacuum-bag assembly 202 includes only the vacuum bagging 112. For example, in implementations where shaping and smoothing of a surface of the composite layup 152 (e.g., by using a caul plate) is not required or desired, the vacuum-bag assembly 202 may be formed entirely from the vacuum bagging 112.

Figure 4:
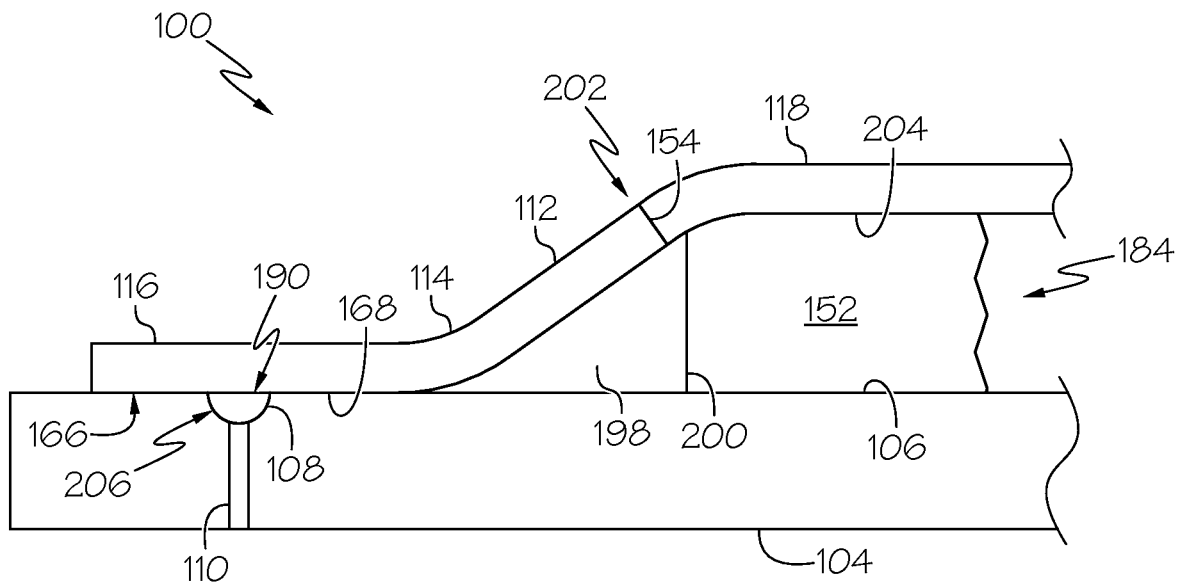
FIG. 4 is a schematic, sectional view of an example of a portion of the apparatus.
Figure 5:
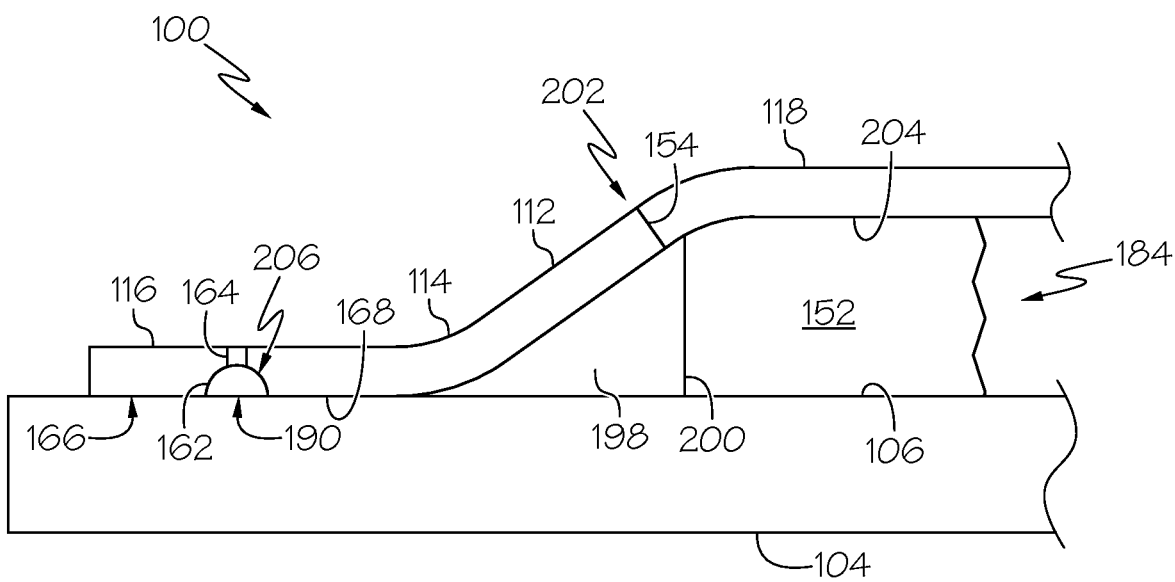
FIG. 5 is a schematic, sectional view of an example of a portion of the apparatus.

Referring to FIGS. 2-6 and 8, the vacuum bagging 112 includes an elastomeric membrane 114. The elastomeric membrane 114 is configured to drape over and conform to at least a portion of the tooling surface 106 of the mandrel 104 such that the composite layup 152 is located between the mandrel 104 and the vacuum-bag assembly 202. A portion of the elastomeric membrane 114 is configured to be sealingly coupled to the tooling surface 106 of the mandrel 104 along an edge-sealing interface via vacuum to form the vacuum seal 190 (FIGS. 4 and 5).

In one or more examples, the elastomeric membrane 114 is made of silicone. In another example, the elastomeric membrane 114 is made of synthetic rubber. In yet another example, the elastomeric membrane 114 is made of a fluoropolymer elastomer. In one or more examples, the elastomeric membrane 114 is made of a fluoroelastomer material, such as Viton®. In still other examples, the elastomeric membrane 114 is made of any other suitable elastomeric material or combination of materials.

In one or more examples, the caul 118 includes a perimeter edge 154 (FIGS. 2-5 and 8) and a caul surface 204 (FIGS. 4 and 5). In one or more examples, the elastomeric membrane 114 is coupled to the caul 118 and extends from at least a portion of the perimeter edge 154 of the caul 118. In one or more examples, the elastomeric membrane 114 may extend from an entirety of the perimeter edge 154 of the caul 118 (e.g., as shown in FIGS. 2 and 3).

The caul 118 is configured to be applied over the composite layup 152 that is supported by the mandrel 104, such as to the outer mold line 156 (FIG. 1) or the inner mold line 170 (FIG. 1) of the composite layup 152, such that the composite layup 152 is located between the caul 118 and the mandrel 104, when the elastomeric membrane 114 is sealed to the mandrel 104 (e.g., as shown in FIGS. 4 and 5).

In one or more examples, at least a portion of the caul 118, such as the caul surface 204 (FIGS. 4 and 5), is configured (e.g., shaped and sized) to contact the composite layup 152 and the elastomeric membrane 114 is configured (e.g., shaped and sized) to contact the mandrel 104 surrounding the composite layup 152. In one or more examples, the caul surface 204 is suitably sized and shaped and has a suitable surface smoothness to provide the surface of the composite structure 102 with a desired shape and smoothness.

In one or more examples, the caul 118 extends beyond a peripheral edge of the composite layup 152 (e.g., as shown in FIGS. 4 and 5). In one or more examples, a sacrificial material 198 (e.g., as shown in FIGS. 4 and 5) is located around and/or extends from a peripheral edge 200 of the composite layup 152 to reduce the geometric complexity of the caul 118 and/or prevent the caul 118 from flexing over a perimeter step down. In one or more examples, a portion of the elastomeric membrane 114 drapes over the sacrificial material 198 (e.g., beyond the peripheral edge 200 of the composite layup 152) such that a portion of the elastomeric membrane 114 contacts the sacrificial material 198 surrounding the composite layup 152 and a portion of the elastomeric membrane 114 contacts the mandrel 104 surrounding the sacrificial material 198 (e.g., as shown in FIGS. 4 and 5). In one more examples, the elastomeric membrane 114 is inherently capable of releasing from the sacrificial material 198 or a release coating (not shown) is applied to the portion of the elastomeric membrane 114 that contacts the sacrificial material 198.

The caul 118 is generally made of broad piece (e.g., sheet) of material that is substantially free of surface defects. The caul surface 204 (FIGS. 4 and 5) of the caul 118 is used to intimately contact the surface of the composite layup 152 during processing to establish the mold line of the composite structure 102 and provide the composite structure 102 with a smooth surface (e.g., outer surface).

The caul 118 may have any shape, dimensions, or complexity depending upon the composite structure 102 (e.g., part or component) being made. In one or more examples, the caul 118 is rigid and has a profile shape that matches the desired shape of the surface (e.g., outer mold line) of the composite structure 102. In one or more examples, the caul 118 may be at least somewhat flexible such that the caul 118 conforms to the surface of the composite layup 152.

In one or more examples, the caul 118 is planar. In one or more examples, the caul 118 has a curvature in one or more directions. In one or more examples, the caul 118 has any one of various other complex shapes.

Figure 8:
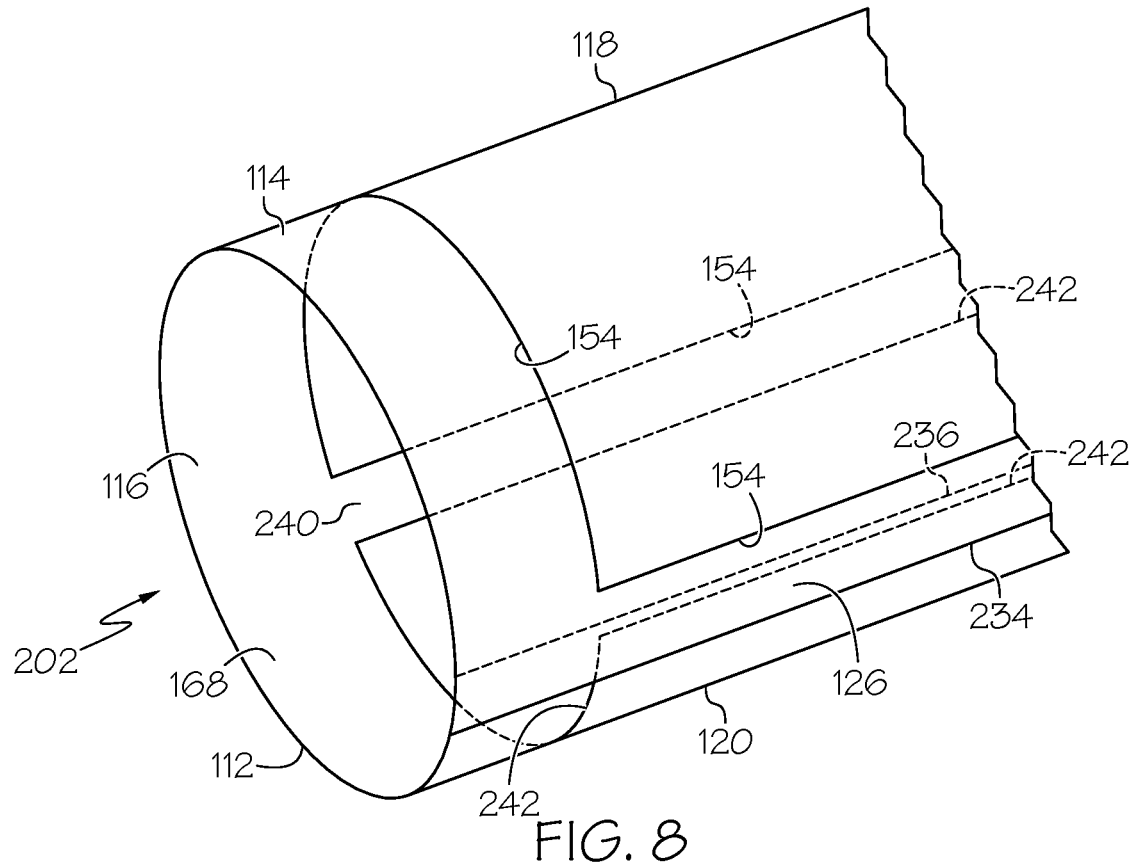
FIG. 8 is a schematic, perspective of an example of a portion of a vacuum-bag assembly of the apparatus.
Figure 20:
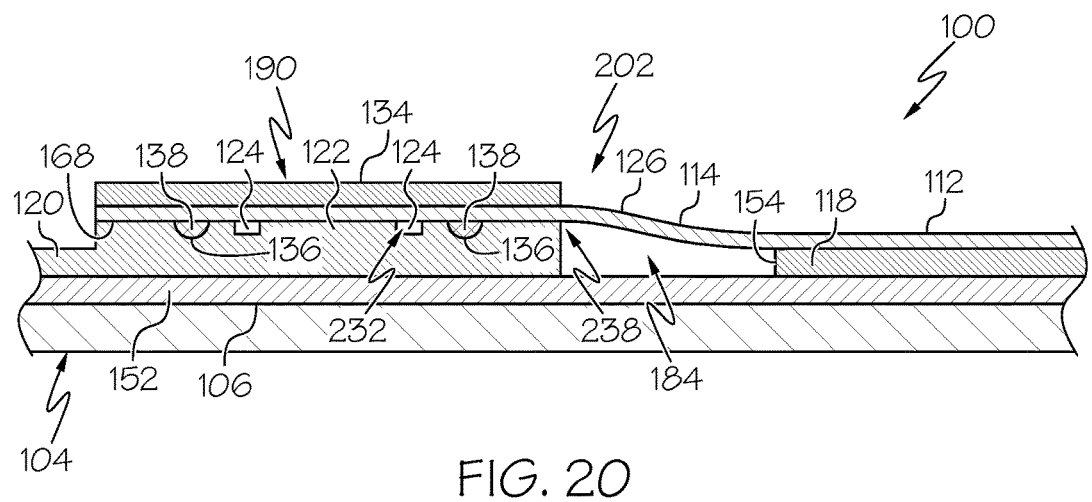
FIG. 20 is a schematic, sectional view of an example of a portion of the apparatus.
Figure 21:
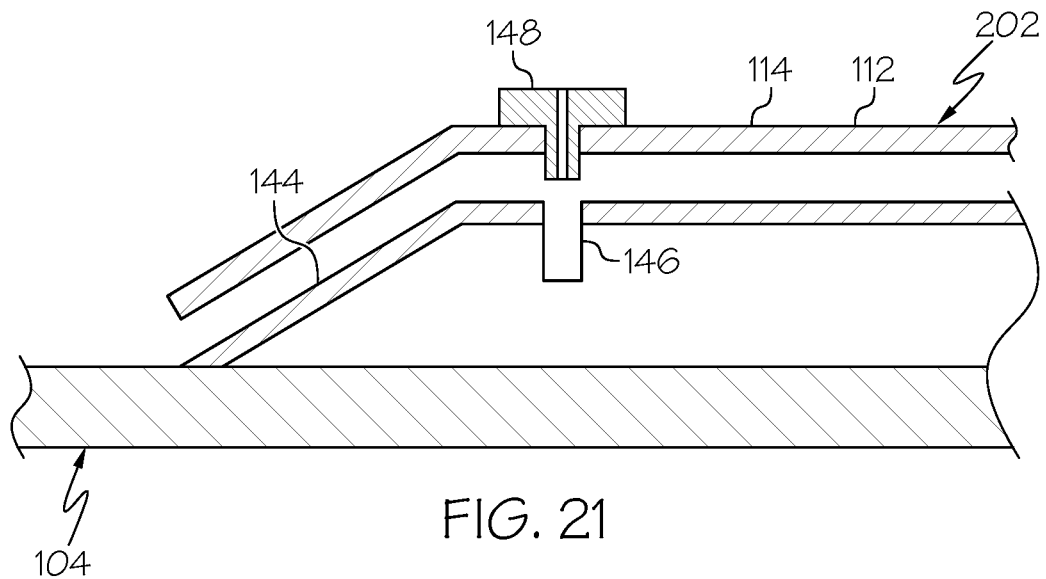
FIG. 21 is a schematic, sectional view of an example of a mandrel bladder of the mandrel.
Figure 22:
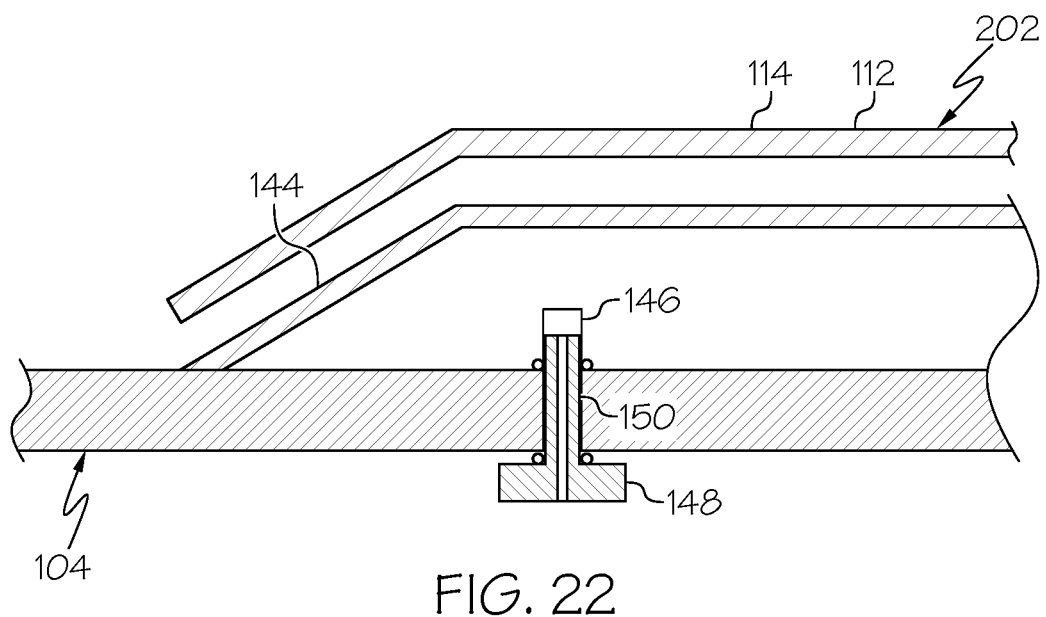
FIG. 22 is a schematic, sectional of an example of the mandrel bladder of the mandrel.

In one or more examples, the vacuum-bag assembly 202 includes more than one caul, such as the caul 118 and a second caul 120 (e.g., as shown in FIGS. 8, 8 and 20). In one or more examples, a connection portion 240 of the vacuum bagging 112 (e.g., the elastomeric membrane 114) extends between a portion of the perimeter edge 154 of the caul 118 and a portion of a second perimeter edge 242 of the second caul 120 to interconnect the caul 118 and the second caul 120 (e.g., as shown in FIG. 8).

In one or more examples, the vacuum-bag assembly 202 includes any number of cauls, such as a third caul, a fourth caul, etc. In one or more examples, each one of the cauls (e.g., the caul 118, the second caul 120, the third caul, etc.) is coupled to the elastomeric membrane 114 of the same vacuum bagging 112.

The caul 118 is made of any suitable material. In one or more examples, the caul 118 is constructed from a fiber-reinforced polymer material, such as, but not limited to, carbon fiber-reinforced polymer and carbon fiber-reinforced epoxy. As examples, the caul 118 is made of carbon fiber-reinforced benzoxazine or carbon fiber-reinforced bismaleimide. In one or more examples, the caul 118 is constructed from a metallic material, such as, but not limited to aluminum. In one or more examples, the caul 118 is constructed from a metallic alloy, such as but not limited to, a nickel-iron alloy (e.g., Invar).

The caul 118 and the elastomeric membrane 114 are coupled together via any suitable method or technique. In one or more examples, the caul 118 and the elastomeric membrane 114 are secondarily bonded together. For example, the caul 118 and the elastomeric membrane 114 are cured separately and then chemically bonded (e.g., via adhesives or another bonding agent). In one or more examples, the caul 118 and the elastomeric membrane 114 are co-cured. In one or more examples, the elastomeric membrane 114 is co-bonded to the caul 118. In one or more examples, the caul 118 and the elastomeric membrane 114 are connected together via a mechanical attachment, such as fasteners.

The vacuum bagging 112 (e.g., elastomeric membrane 114) of the vacuum-bag assembly 202 is constructed to be substantially impermeable to prevent gas from passing through the vacuum-bag assembly 202. The caul 118 of the vacuum-bag assembly 202 is constructed to be substantially impermeable to prevent gas from passing through the vacuum-bag assembly 202. In examples of the vacuum-bag assembly 202 that includes both the vacuum bagging 112 and the caul 118, the area along which the vacuum bagging 112 (e.g., elastomeric membrane 114) and the caul 118 are coupled together is substantially impermeable to prevent gas from passing between the vacuum bagging 112 and the caul 118. As such, the vacuum-bag assembly 202 serves as a reusable alternative to conventional consumable vacuum or compression bagging.

In one or more examples, contact and bonding between the caul 118 and the elastomeric membrane 114 occurs at an edge interface, such as along the perimeter edge 154 of the caul 118. In one or more examples, a portion of the elastomeric membrane 114 overlaps (e.g., covers) a portion of the caul 118 at the edge interface. Overlapping portions of caul 118 and the elastomeric membrane 114 are coupled (e.g., bonded) together such that a portion of the elastomeric membrane 114 extends from the perimeter edge 154 of the caul 118. These examples advantageously reduce the overall weight of the vacuum-bag assembly 202.

In one or more examples, contact and bonding between the caul 118 and the elastomeric membrane 114 occurs over an entirety of the caul 118. In one or more examples, the elastomeric membrane 114 completely overlaps (e.g., covers) the caul 118. Overlapping portions of caul 118 and the elastomeric membrane 114 are coupled (e.g., bonded) together such that a portion of the elastomeric membrane 114 extends from the perimeter edge 154 of the caul 118. These examples advantageously improve impermeability of the vacuum-bag assembly 202 and improve the integrity of the seal between the elastomeric membrane 114 and the caul 118.

Referring again to FIG. 1, in one or more examples, the surface interface 166 between the mandrel 104 and the vacuum-bag assembly 202 includes a vacuum channel 158 and a vacuum port 160 that is in fluid communication with the vacuum channel 158. The vacuum-bag assembly 202 is configured to be sealed to the mandrel 104 along the vacuum channel 158 in response to a vacuum applied to the vacuum channel 158 via the vacuum port 160. In one or more examples, a portion of vacuum bagging 112 is configured to be sealed to the mandrel 104 along the vacuum channel 158 in response to the vacuum applied to the vacuum channel 158 via the vacuum port 160.

In one or more examples, the apparatus 100 includes a vacuum source 178. In one or more examples, the vacuum source 178 includes one or more vacuum pumps. The vacuum source 178 is coupled to the vacuum port 160 and is in fluid communication with the vacuum channel 158. In one or more examples, the vacuum port 160 is in fluid communication with the vacuum source 178 via a plurality of vacuum lines. The vacuum source 178 is configured to evacuate gas located within the vacuum channel 158 to procure adhesion between the vacuum bagging 112 and the mandrel 104.

In one or more examples, the surface interface 166 is formed by the tooling surface 106 of the mandrel 104 and a bagging surface 168 of the vacuum-bag assembly 202. In one or more examples, the bagging surface 168 is a surface of the vacuum bagging 112 that opposes and contacts the tooling surface 106 of the mandrel 104. With the vacuum-bag assembly 202 positioned over the composite layup 152 and the bagging surface 168 in contact with the tooling surface 106 (e.g., as shown in FIGS. 4 and 5), the surface interface 166 forms the vacuum seal 190 (FIG. 1), or a seal boundary, between the vacuum-bag assembly 202 and the mandrel 104 along the vacuum channel 158 in response to the vacuum applied to the vacuum channel 158.

Referring to FIGS. 2 and 4, in one or more examples, the mandrel 104 includes a mandrel vacuum channel 108 that is formed in the tooling surface 106 and a mandrel vacuum port 110 that is formed through the tooling surface 106 and that is in fluid communication with the mandrel vacuum channel 108. The mandrel vacuum channel 108 is an example of the vacuum channel 158 (FIG. 1) and the mandrel vacuum port 110 is an example of the vacuum port 160 (FIG. 1). In these examples, the vacuum source 178 (FIG. 1) is coupled to the mandrel vacuum port 110 and is in fluid communication with the mandrel vacuum channel 108.

In one or more example, an edge portion 116 of the vacuum-bag assembly 202 (e.g., of the vacuum bagging 112) is configured to be sealed to the tooling surface 106 along the mandrel vacuum channel 108 in response to the vacuum applied to the mandrel vacuum channel 108 via the mandrel vacuum port 110. As such, the sealed vacuum chamber 184 (FIG. 4) that encloses the composite layup 152 is formed between the mandrel 104 and the vacuum-bag assembly 202 in response to the vacuum applied to the mandrel vacuum channel 108 via the mandrel vacuum port 110. A perimeter, or boundary, of the sealed vacuum chamber 184 is formed by the vacuum seal 190 (FIG. 4) between the tooling surface 106 of the mandrel 104 and the bagging surface 168 of the edge portion 116 of the vacuum-bag assembly 202 (e.g., the vacuum bagging 112) along the mandrel vacuum channel 108.

Referring to FIGS. 3 and 5, in one or more examples, the vacuum-bag assembly 202 includes a bagging vacuum channel 162 that is formed in the bagging surface 168 of the vacuum bagging 112 and a bagging vacuum port 164 that is formed through the bagging surface 168 and that is in fluid communication with the bagging vacuum channel 162. The bagging vacuum channel 162 is an example of the vacuum channel 158 (FIG. 1) and the bagging vacuum port 164 is an example of the vacuum port 160 (FIG. 1). In FIG. 3, the bagging vacuum channel 162 and the bagging vacuum port 164 are illustrated in broken lines to depict the bagging vacuum channel 162 and the bagging vacuum port 164 being formed in the bagging surface 168 (e.g., an underside surface) of the edge portion 116 of the vacuum-bag assembly 202 (e.g., of the vacuum bagging 112).

In one or more examples, the edge portion 116 of the vacuum-bag assembly 202 is configured to be sealed to the tooling surface 106 along the bagging vacuum channel 162 in response to the vacuum applied to the bagging vacuum channel 162 via the bagging vacuum port 164. As such, the sealed vacuum chamber 184 (FIG. 5) that encloses the composite layup 152 is formed between the mandrel 104 and the vacuum-bag assembly 202 in response to the vacuum applied to the bagging vacuum channel 162 via the bagging vacuum port 164. The perimeter of the sealed vacuum chamber 184 is formed by the vacuum seal 190 (FIG. 5) between the tooling surface 106 of the mandrel 104 and the bagging surface 168 of the edge portion 116 of the vacuum-bag assembly 202 (e.g., the vacuum bagging 112) along the bagging vacuum channel 162.

In one or more examples of the apparatus 100 (not explicitly illustrated), the mandrel 104 includes the mandrel vacuum channel 108 (e.g., as shown in FIGS. 2 and 4) and the mandrel vacuum port 110 (e.g., as shown in FIGS. 2 and 4), formed in the tooling surface 106, and the vacuum-bag assembly 202 includes the bagging vacuum channel 162 (e.g., as shown in FIGS. 3 and 5) and the bagging vacuum port 164 (e.g., as shown in FIGS. 3 and 5), formed in the bagging surface 168. In these examples, the mandrel vacuum channel 108 and the bagging vacuum channel 162, in combination, are an example of the vacuum channel 158 (FIG. 1) and the mandrel vacuum port 110 and the bagging vacuum port 164, in combination, are an example of the vacuum port 160 (FIG. 1).

In examples of the apparatus 100 that includes both the mandrel vacuum channel 108/mandrel vacuum port 110 in the mandrel 104 (e.g., as shown in FIGS. 2 and 4) and the bagging vacuum channel 162/bagging vacuum port 164 in the vacuum-bag assembly 202 (e.g., as shown in FIGS. 3 and 5), the mandrel vacuum channel 108 and the bagging vacuum channel 162 are spaced away from each other, or are otherwise suitably located, such that there is no overlap or intersection between them. In these examples, the vacuum-bag assembly 202 is configured to be sealed to the tooling surface 106 of the mandrel 104 along the mandrel vacuum channel 108 in response to the vacuum applied to the mandrel vacuum channel 108 and the tooling surface 106 is configured to be sealed to the vacuum-bag assembly 202 along the bagging vacuum channel 162 in response to the vacuum applied to the bagging vacuum channel 162. As such, the sealed vacuum chamber 184 that encloses the composite layup 152 is formed by the mandrel 104 and the vacuum-bag assembly 202 in response to the vacuum applied to the mandrel vacuum channel 108 and the bagging vacuum channel 162 via the mandrel vacuum port 110 and the bagging vacuum port 164, respectively. Use of both the mandrel vacuum channel 108 and the bagging vacuum channel 162 to form the perimeter of the sealed vacuum chamber 184 provides a redundancy in the vacuum seal 190 (e.g., a dual vacuum seal) between the tooling surface 106 of the mandrel 104 and the bagging surface 168 of the edge portion 116 of the vacuum-bag assembly 202.

In one or more examples, the vacuum channel 158 (e.g., the mandrel vacuum channel 108 and/or the bagging vacuum channel 162 has any suitable configuration. The vacuum channel 158 forms the perimeter of the vacuum seal 190 between the mandrel 104 and the vacuum-bag assembly 202.

In one or more examples, the vacuum channel 158 is continuous and forms an entirety of the perimeter of the vacuum seal 190, such as used for processing the composite structure 102 that is planar, curved or has an open cross-sectional shape. As illustrated in FIG. 2, in one or more examples, the mandrel vacuum channel 108 is continuous and includes one or more linear channel-segments and/or one or more curved channel-segments formed in the tooling surface 106 that forms an entirety of the perimeter of the vacuum seal 190. As illustrated in FIG. 3, in one or more examples, the bagging vacuum channel 162 is continuous and includes one or more linear channel-segments and/or one of more curved channel-segments formed in the bagging surface 168 that forms an entirety of the perimeter of the vacuum seal 190.

In one or more examples, the vacuum channel 158 is continuous and forms a portion of the perimeter of the vacuum seal 190, such as used for processing the composite structure 102 that has a closed cross-sectional shape. As illustrated in FIG. 5, in one or more examples, the mandrel vacuum channel 108 is continuous and includes one or more linear channel-segments and/or one of more curved channel-segments formed in the tooling surface 106 at a first mandrel-end 182 of the mandrel 104 that forms a first portion of the perimeter of the vacuum seal 190. The mandrel 104 also includes another mandrel vacuum channel 108 (e.g., a second one of a plurality of mandrel vacuum channels) formed in the tooling surface 106 at an opposing second mandrel-end 186 (FIG. 6) of the mandrel 104 that forms a second portion of the perimeter of the vacuum seal 190. Only the first mandrel-end 182 of the mandrel 104 and the mandrel vacuum channel 108 associated with the first mandrel-end 182 are shown in FIG. 7. It should be recognized that the second mandrel-end 186 of the mandrel 104 and the mandrel vacuum channel 108 associated with the second mandrel-end 186 have a substantially similar configuration as that shown in FIG. 7.

The illustrative examples depict the surface interface 166 as including one vacuum channel 158 (e.g., one mandrel vacuum channel 108 and/or one bagging vacuum channel 162) and one vacuum port 160 (e.g., one mandrel vacuum port 110 and/or one bagging vacuum port 164). However, in other examples, the surface interface 166 may include any number of vacuum channels 158 and any number of associated vacuum ports 160.

FIGS. 6-8 schematically illustrate examples of the apparatus 100 used to form the composite structure 102 that has the closed cross-sectional (e.g., tubular shape), such as, but not limited to, a fuselage barrel section. In one or more examples, the mandrel 104 is configured to be positioned within an oven or autoclave (e.g., the processing equipment 192). In one or more examples, the mandrel 104 is supported by a movable platform or processing cart (e.g., as shown in FIG. 6). The vacuum-bag assembly 202 (FIGS. 6 and 8) is positioned over the composite layup 152 (FIG. 7) such that the caul 118 is applied to the surface of the composite layup 152 and the edge portion 116 (FIGS. 6 and 8) of the vacuum-bag assembly 202 (e.g., the vacuum bagging 112 extending from the perimeter edge 154 of the caul 118) is in contact with the tooling surface 106 (FIG. 7) at both the first mandrel-end 182 (FIGS. 6 and 7) and the second mandrel-end 186 (FIG. 6) of the mandrel 104. With the bagging surface 168 (FIG. 8) of the edge portion 116 of the vacuum-bag assembly 202 in contact with the tooling surface 106 of the mandrel 104, application of the vacuum to the mandrel vacuum channel 108 (FIG. 7) generates a negative pressure (e.g., suction) that achieves and maintains adhesion between the vacuum-bag assembly 202 and the mandrel 104.

Figure 9:
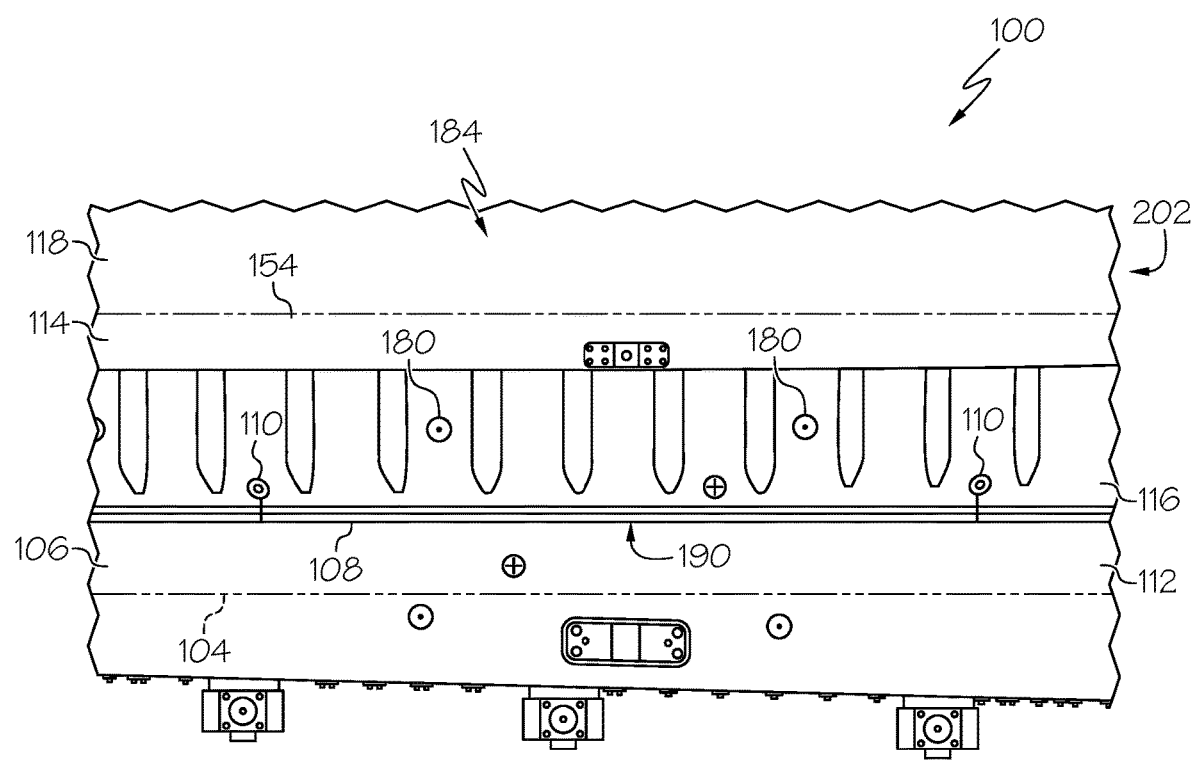
FIG. 9 is a schematic, plan view of an example of a portion of the apparatus.

FIG. 9 schematically illustrates an example of a portion of the mandrel 104 and a portion of the vacuum-bag assembly 202 at the surface interface 166. In one or more examples, such as illustrated in FIG. 9, the vacuum channel 158 and the vacuum port 160 are formed in the tooling surface 106 of the mandrel 104 (e.g., the mandrel vacuum channel 108 and the mandrel vacuum port 110). In these examples, the vacuum bagging 112 extends from the perimeter edge 154 of the caul 118 and is positioned in contact with the tooling surface 106 such that the edge portion 116 of the vacuum-bag assembly 202 is located over the mandrel vacuum channel 108. The vacuum applied to the mandrel vacuum channel 108 adheres the edge portion 116 of the vacuum-bag assembly 202 (e.g., the vacuum bagging 112) to the mandrel 104.

Alternatively or additionally, in one or more examples, the vacuum channel 158 and the vacuum port 160 are formed in the bagging surface 168 of the vacuum-bag assembly 202 (e.g., the bagging vacuum channel 162 and the bagging vacuum port 164) with a configuration that is substantially the same as that illustrated in FIG. 9. In these examples, the vacuum bagging 112 extends from the perimeter edge 154 of the caul 118 and is positioned in contact with the tooling surface 106 such that the edge portion 116 of the vacuum-bag assembly 202 that includes the bagging vacuum channel 162 is over the tooling surface 106 of the mandrel 104. The vacuum applied to the bagging vacuum channel 162 adheres the edge portion 116 of the vacuum-bag assembly 202 (e.g., the vacuum bagging 112) to the mandrel 104.

Upon application of the vacuum to the vacuum channel 158 (e.g., the mandrel vacuum channel 108 and/or the bagging vacuum channel 162), the vacuum seal 190 is created between the vacuum-bag assembly 202 and the mandrel 104 and the sealed vacuum chamber 184 is formed around the composite layup 152 by the vacuum-bag assembly 202 and the mandrel 104. In one or more examples, the mandrel 104 also includes a plurality of processing vacuum ports 180. Generally, the processing vacuum ports 180 are situated toward ends of the mandrel 104 within the sealed vacuum chamber 184, such as between a perimeter boundary of the composite layup 152, supported on the mandrel 104, and the vacuum seal 190, formed between the vacuum-bag assembly 202 and the mandrel 104. A vacuum source (e.g., the vacuum source 178) is coupled to the processing vacuum ports 180 and is in fluid communication with the sealed vacuum chamber 184. The vacuum source 178 is configured to evacuate gas from within the sealed vacuum chamber 184 via the processing vacuum ports 180 and to generate a negative pressure within the sealed vacuum chamber 184. Evacuating the gas between the vacuum-bag assembly 202 and the mandrel 104 facilitates higher pressure outside of the vacuum-bag assembly 202, thus pushing the vacuum-bag assembly 202 (e.g., the caul 118) against the outer surface of the composite layup 152 and resulting in compression of the composite layup 152 against the tooling surface 106 of the mandrel 104. Additionally, evacuating the gas between the vacuum-bag assembly 202 and the mandrel 104 removes air, water vapor, and/or other volatiles that may escape from the composite layup 152 during processing.

Referring again to FIG. 5, in one or more examples, the vacuum source 178 is coupled to the mandrel 104 via a mandrel manifold 188. The processing vacuum ports 180 are in fluid communication with the mandrel manifold 188 via a plurality of vacuum lines to apply the vacuum to the sealed vacuum chamber 184. In one or more examples, the mandrel vacuum port 110 is also coupled to and is in fluid communication with the mandrel manifold 188 to apply the vacuum to the mandrel vacuum channel 108.

In one or more examples, the apparatus 100 uses the same vacuum source (e.g., vacuum source 178) to create the vacuum that seals the vacuum-bag assembly 202 and the mandrel 104 together and to generate the negative pressure within the sealed vacuum chamber 184. In other examples, the apparatus 100 uses the different (e.g., dedicated) vacuum sources to create the vacuum that seals the vacuum-bag assembly 202 and the mandrel 104 together and to generate the negative pressure within the sealed vacuum chamber 184.

Figure 10:
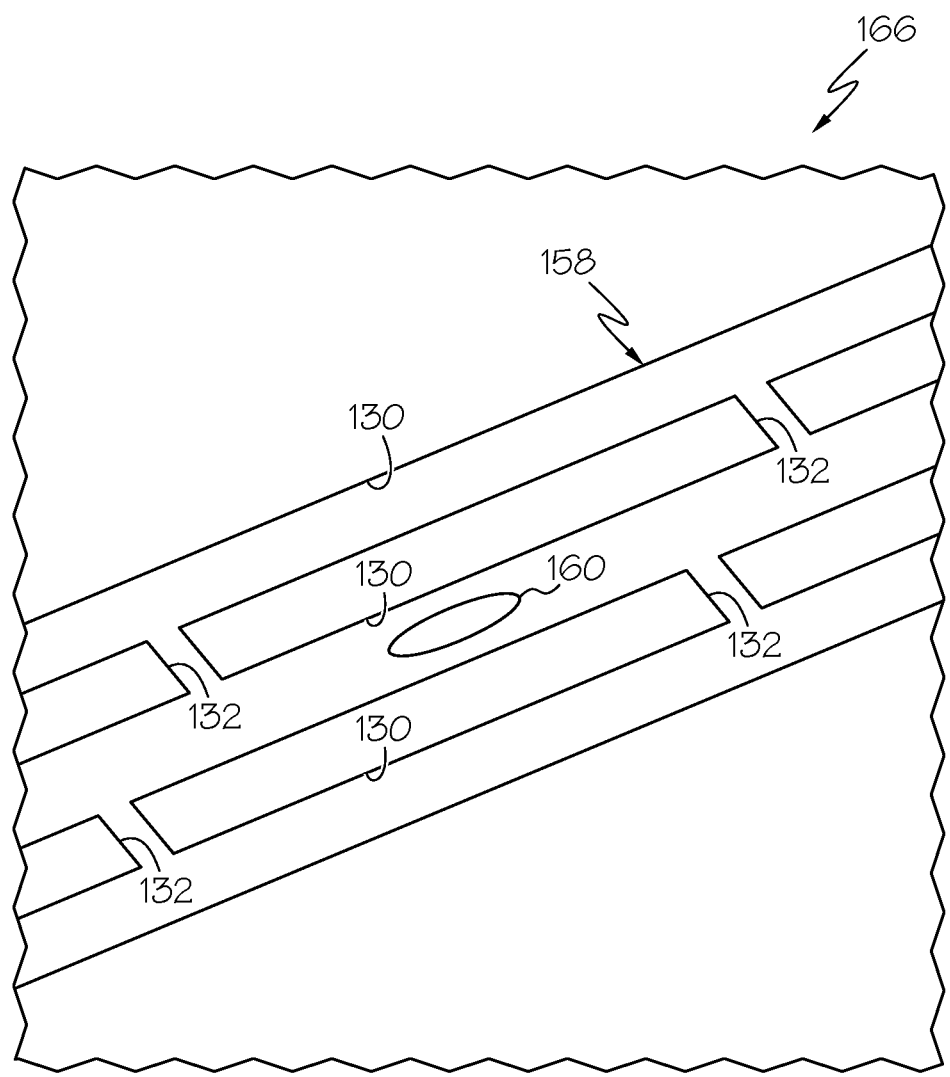
FIG. 10 is a schematic, perspective view of an example of a vacuum channel of the apparatus.

FIG. 10 schematically illustrates an example of the surface interface 166. In one or more examples, the vacuum channel 158 includes a plurality of primary grooves 130 and a plurality of jumper grooves 132. The plurality of jumper grooves 132 extend between the plurality of primary grooves 130. The plurality of primary grooves 130 is in fluid communication with each other and with the vacuum port 160 via the plurality of jumper grooves 132. The plurality of primary grooves 130 and the plurality of jumper grooves 132 serve as a breather channel or breather system and distribute the vacuum within a perimeter vacuum chamber 206 formed between the vacuum-bag assembly 202 and the mandrel 104 that forms the vacuum seal 190.

In one or more examples, the perimeter vacuum chamber 206 is formed by the tooling surface 106, the bagging surface 168, and the vacuum channel 158 (e.g., the plurality of primary grooves 130. The vacuum is applied to the perimeter vacuum chamber 206 via the vacuum channel 158 to form the vacuum seal 190. The perimeter vacuum chamber 206 forms a portion of a perimeter boundary of the sealed vacuum chamber 184. The sealed vacuum chamber 184 is fluidly isolated from the perimeter vacuum chamber 206.

In one or more examples, at least one of the jumper grooves 132 extends between each directly adjacent (e.g., side-by-side) pair of the primary grooves 130 such that each one of the primary grooves 130 is in fluid communication with other primary grooves 130 and the vacuum port 160. The plurality of jumper grooves 132 provide a fluid path for removal of gas from within each one of the plurality of primary grooves 130.

The plurality of primary grooves 130 increases the interface area between the mandrel 104 and the vacuum-bag assembly 202. The plurality of primary grooves 130 also provide redundancies within the vacuum channel 158. For example, if a portion of the vacuum seal 190 between the vacuum-bag assembly 202 and the mandrel 104 is broken along one of the primary grooves 130, the vacuum seal 190 between the vacuum-bag assembly 202 and the mandrel 104 is maintained along another one of the primary grooves 130. Additionally, gas from the atmosphere surrounding the vacuum-bag assembly 202 is evacuated by the vacuum port 160 via the jumper grooves 132 as it enters the primary groove 130 of a broken portion of the vacuum seal 190 before the gas enters the sealed vacuum chamber 184 formed between the vacuum-bag assembly 202 and the mandrel 104.

It should be appreciated that the example of the vacuum channel 158 and the vacuum port 160 shown in FIG. 10 is applicable to examples of the mandrel vacuum channel 108 and the mandrel vacuum port 110 (e.g., as shown in FIGS. 2 and 4) and to examples of the bagging vacuum channel 162 and the bagging vacuum port 164 (e.g., as shown in FIGS. 3 and 5).

Accordingly, the caul 118 provides a reusable processing surface used to establish the mold line of the composite structure 102. The vacuum bagging 112 provides a reusable drapeable edge (e.g., edge portion 116) for the vacuum-bag assembly 202. The vacuum channel 158 (FIG. 1), such as the mandrel vacuum channel 108 (e.g., as shown in FIGS. 2, 4, 7 and 9) and/or the bagging vacuum channel 162 (e.g., as shown in FIGS. 3 and 5), provides a mechanism to repeatably and reliably seal the vacuum-bag assembly 202 to the mandrel 104 and form the sealed vacuum chamber 184 around the composite layup 152. Consequently, use of the vacuum-bag assembly 202 advantageously eliminates most, if not all, of the consumable materials typically used for edge-sealing of conventional vacuum bags used in composite processing.

Figure 11:
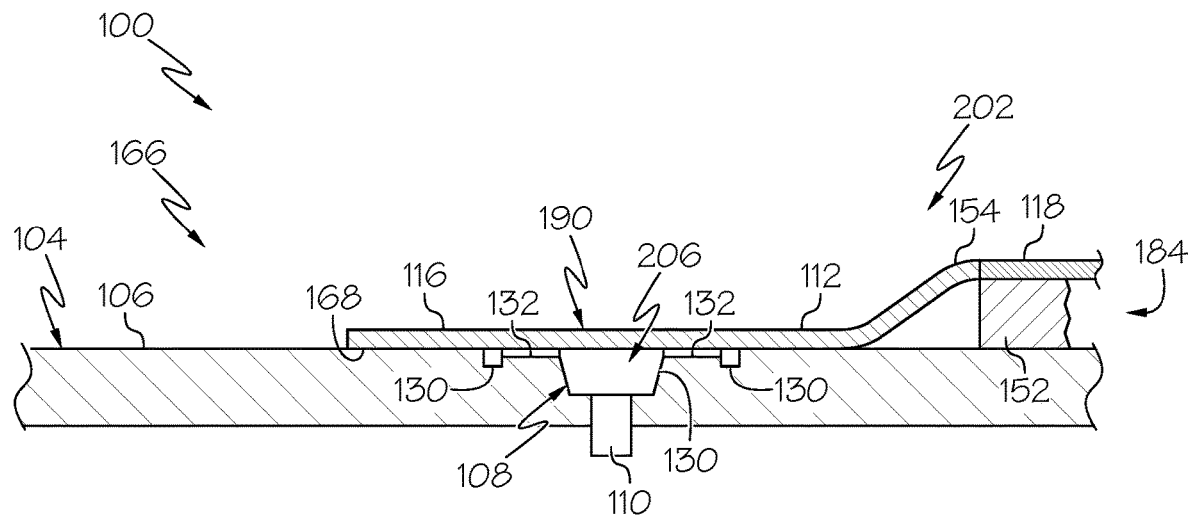
FIG. 11 is a schematic, sectional view of an example of a portion of the apparatus.
Figure 12:
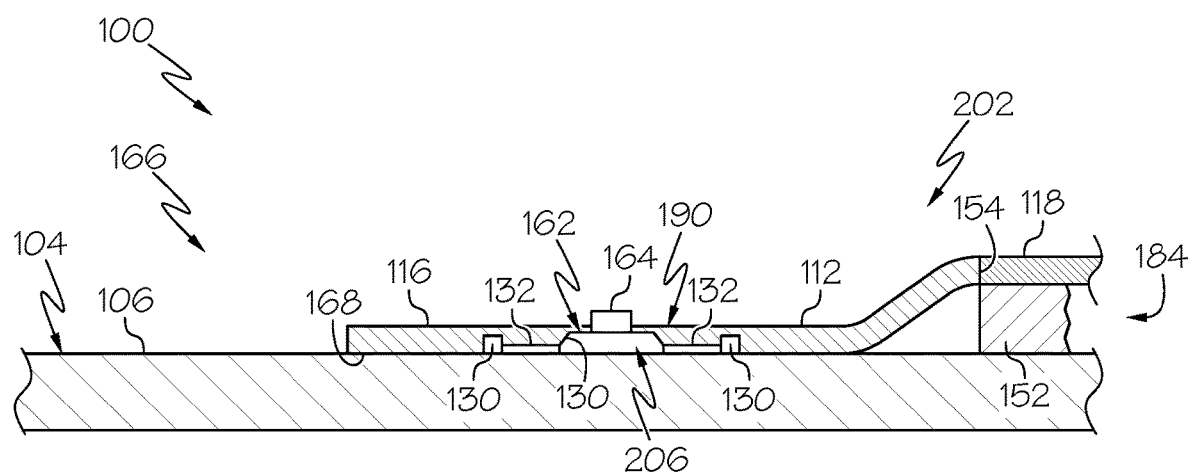
FIG. 12 is a schematic, sectional view of an example of a portion of the apparatus.
Figure 13:
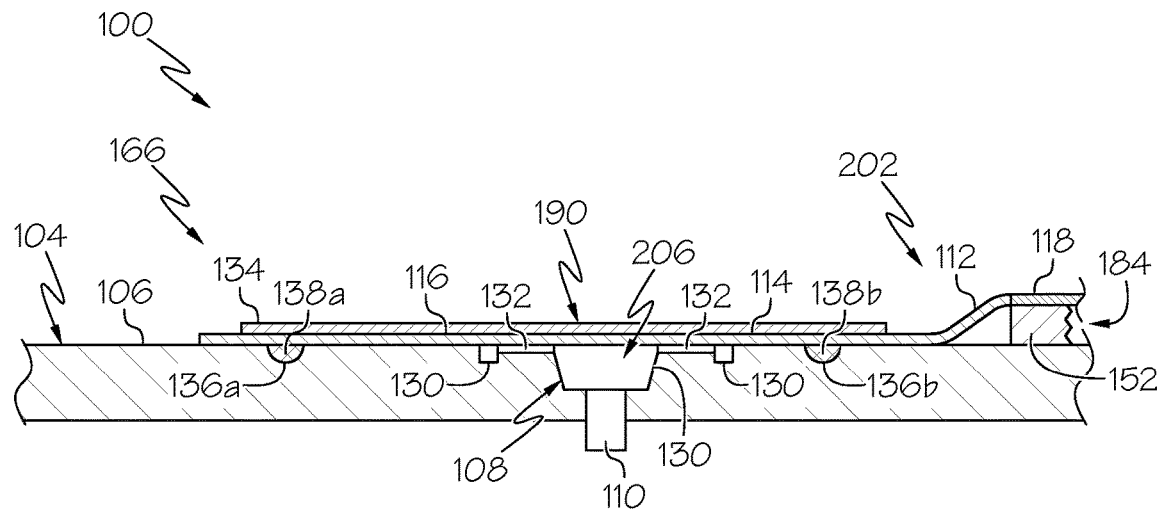
FIG. 13 is a schematic, sectional view of an example of a portion of the apparatus.

Placing the caul 118 over the composite layup 152 and forming the vacuum chamber 184 after sealing the edge portion 116 of the vacuum-bag assembly 202 to the mandrel 104 forms the perimeter vacuum chamber 206 (e.g., as shown in FIGS. 4, 5, 11 and 12) via the vacuum channel 158 (e.g., the mandrel vacuum channel 108 (e.g., as shown in FIGS. 4 and 11) and/or the bagging vacuum channel 162 (e.g., as shown in FIGS. 5 and 12)). The perimeter vacuum chamber 206 is located at a perimeter region of the mandrel 104 and the vacuum-bag assembly 202 and is distinct from the vacuum chamber 184 that surrounds the composite layup 152. The vacuum channel 158 (e.g., the mandrel vacuum channel 108 and/or the bagging vacuum channel 162) enables a region along the perimeter of the mandrel 104 and the vacuum-bag assembly 202 to be evacuated, thereby allowing atmospheric pressure to clamp the edge portion 116 of the vacuum-bag assembly 202 to the mandrel 104. The vacuum channel 158 is located only in the perimeter region of the mandrel 104 and the vacuum-bag assembly 202 and does not pass out of this region and into the sealed vacuum chamber 184 or in another direction beyond the perimeter region. Thus, the edge portion 116 of the vacuum-bag assembly 202 is clamped down to the mandrel 104 forming an edge seal. In one or more examples, the plurality of primary grooves 130 and the plurality of jumper grooves 132 (e.g., as shown in FIGS. 9-12), also referred to as a breather channel, form at least two edge seals.

FIG. 11 schematically illustrates an example of the vacuum seal 190 (e.g., the perimeter edge seal) formed by the surface interface 166 between the edge portion 116 of the vacuum-bag assembly 202 and the mandrel 104. The vacuum-bag assembly 202 is placed over the composite layup 152 and the mandrel 104 such that the caul 118 is positioned over the composite layup 152 and the edge portion 116 of the vacuum-bag assembly 202 (e.g., the vacuum bagging 112) is draped over the tooling surface 106 of the mandrel 104.

The perimeter vacuum chamber 206 is formed between the mandrel 104 and edge portion 116 of the vacuum-bag assembly 202 by evacuating gas from within the mandrel vacuum channel 108, thereby allowing atmospheric pressure to clamp the edge portion 116 of the vacuum-bag assembly 202 to the mandrel 104. The sealed vacuum chamber 184 is formed by the mandrel 104, the vacuum-bag assembly 202, and the vacuum seal 190 between the mandrel 104 and the vacuum-bag assembly 202. The sealed vacuum chamber 184 surrounds the composite layup 152 for processing the composite layup 152.

In one or more examples, the mandrel vacuum channel 108 includes the plurality of (e.g., three) primary grooves 130 and the plurality of jumper grooves 132 extending between the plurality of primary grooves 130. At least one of the primary grooves 130 is in fluid communication with the mandrel vacuum port 110. The plurality of primary grooves 130 is in fluid communication with each other and with the mandrel vacuum port 110 via the plurality of jumper grooves 132.

FIG. 12 schematically illustrates another example of the vacuum seal 190 (e.g., the perimeter edge seal) formed by the surface interface 166 between the edge portion 116 of the vacuum-bag assembly 202 and the mandrel 104. The vacuum-bag assembly 202 is placed over the composite layup 152 and the mandrel 104 such that the caul 118 is positioned over the composite layup 152 and the edge portion 116 of the vacuum-bag assembly 202 (e.g., the vacuum bagging 112) is draped over the tooling surface 106 of the mandrel 104.

The perimeter vacuum chamber 206 is formed between the mandrel 104 and edge portion 116 of the vacuum-bag assembly 202 by evacuating gas from within the bagging vacuum channel 162, thereby allowing atmospheric pressure to clamp the edge portion 116 of the vacuum-bag assembly 202 to the mandrel 104. The sealed vacuum chamber 184 is formed by the mandrel 104, the vacuum-bag assembly 202, and the vacuum seal 190 between the mandrel 104 and the vacuum-bag assembly 202. The sealed vacuum chamber 184 surrounds the composite layup 152 for processing the composite layup 152.

In one or more examples, the bagging vacuum channel 162 includes the plurality of primary grooves 130 and the plurality of jumper grooves 132 extending between the plurality of primary grooves 130. At least one of the primary grooves 130 is in fluid communication with the bagging vacuum port 164. The plurality of primary grooves 130 is in fluid communication with each other and with the bagging vacuum port 164 via the plurality of jumper grooves 132.

FIGS. 13-19 schematically illustrate other examples of the vacuum seal 190 (e.g., the perimeter edge seal) formed by the surface interface 166 between the edge portion 116 of the vacuum-bag assembly 202 and the mandrel 104. The vacuum-bag assembly 202 is placed over the composite layup 152 and the mandrel 104 such that the caul 118 is positioned over the composite layup 152 and the edge portion 116 of the vacuum-bag assembly 202 (e.g., the vacuum bagging 112) is draped over the tooling surface 106 of the mandrel 104.

The perimeter vacuum chamber 206 is formed between the mandrel 104 and edge portion 116 of the vacuum-bag assembly 202 by evacuating gas from within the mandrel vacuum channel 108, thereby allowing atmospheric pressure to clamp the edge portion 116 of the vacuum-bag assembly 202 to the mandrel 104. The sealed vacuum chamber 184 is formed by the mandrel 104, the vacuum-bag assembly 202, and the vacuum seal 190 between the mandrel 104 and the vacuum-bag assembly 202. The sealed vacuum chamber 184 surrounds the composite layup 152 for processing the composite layup 152.

In one or more examples, the vacuum-bag assembly 202 includes a stiffener 134. In one or more examples, the stiffener 134 is coupled to the edge portion 116 of the vacuum-bag assembly 202 (e.g., the vacuum bagging 112), opposite the bagging surface 168.

The stiffener 134 increases the rigidity of the edge portion 116 of the vacuum-bag assembly 202 for formation of the vacuum seal 190. In one or more examples, the stiffener 134 is made from a rigid or semi-rigid material. The stiffener 134 is made of any suitable material. In one or more examples, the stiffener 134 is made of a fiber-reinforced polymer.

In one or more examples, the stiffener 134 is configured to be located across the mandrel vacuum channel 108 formed in the tooling surface 106 of the mandrel 104. For example, the stiffener 134 is appropriately located on the edge portion 116 of the vacuum-bag assembly 202 such that with the vacuum-bag assembly 202 applied over the composite layup 152, the stiffener 134 extends across, or traverses, the mandrel vacuum channel 108.

In one or more examples, the stiffener 134 is coupled to the elastomeric membrane 114 of the vacuum bagging 112. For example, the stiffener 134 is coupled to a surface of the elastomeric membrane 114 opposite to the bagging surface 168.

In one or more examples, the stiffener 134 is integrated within the vacuum bagging 112 (e.g., the elastomeric membrane 114). For example, the stiffener 134 is formed by a thickened section of the elastomeric membrane 114 at the edge portion 116 of the vacuum-bag assembly 202 that provides rigidity to at least a section of the edge portion 116 of the vacuum-bag assembly 202.

Referring to FIGS. 13-18, in one or more examples, the mandrel 104 includes a pair of seal grooves 136 (identified individually as first seal groove 136a and second seal groove 136b). The pair of seal grooves 136 is formed in the tooling surface 106 alongside the mandrel vacuum channel 108 such that the mandrel vacuum channel 108 is located between the pair of seal grooves 136 and is separated from the pair of seal grooves 136. In one or more examples, the first seal groove 136a is located adjacent to and runs along one (e.g., a first) side of the mandrel vacuum channel 108 and the second seal groove 136b is located adjacent to and runs along an opposing (e.g., a second) side of the mandrel vacuum channel 108.

In one or more examples, the vacuum bagging 112 includes a pair of seals 138 (identified individually as first seal 138a and second seal 138b). The pair of seals 138 is coupled to the edge portion 116 of the vacuum-bag assembly 202. In one or more examples, the pair of seals 138 is coupled to and extends from the bagging surface 168 at the edge portion 116 of the vacuum-bag assembly 202. Each one of the pair of seals 138 is configured to be received by a corresponding one of the pair of seal grooves 136 when the edge portion 116 of the vacuum-bag assembly 202 is draped over the tooling surface 106 of the mandrel 104. The pair of seals 138 is configured to be sealed within (e.g., to form another edge seal with) the pair of seal grooves 136 in response to the vacuum applied to the mandrel vacuum channel 108 to form the perimeter vacuum chamber 206 between the mandrel 104 and edge portion 116 of the vacuum-bag assembly 202. For example, at least a portion of each one of the pair of seals 138 is inserted within and mates with the corresponding one of the pair of seal grooves 136 to form a seal.

When the perimeter vacuum chamber 206 is formed between the mandrel 104 and edge portion 116 of the vacuum-bag assembly 202 by evacuating gas from within the bagging vacuum channel 162, atmospheric pressure clamps the edge portion 116 of the vacuum-bag assembly 202 to the mandrel 104 and seals the pair of seals 138 within the pair of seal grooves 136. Thus, in one or more examples, the pair of seals 138 and the pair of seal grooves 136 form an outer boundary of the perimeter vacuum chamber 206. In one or more examples, the second seal 138b and the second seal groove 136 form an outer boundary of the sealed vacuum chamber 184.

The seals 138 and the seal grooves 136 have any suitable cross-sectional shape. The seals 138 are made from any suitable material. In one or more examples, the seals 138 are made of the same material as the elastomeric membrane 114 of the vacuum bagging 112. In one or more examples, the seals 138 are made a material that is different than the material of the elastomeric membrane 114. In one or more examples, the pair of seals 138 and the pair of seal grooves 136 have complementary geometries that facilitate a sealing interface.

In one or more examples (not explicitly illustrated), the mandrel 104 does not includes the pair of seal grooves 136. In these examples, each one of the pair of seals 138 is configured to contact the tooling surface 106 of the mandrel 104. The pair of seals 138 is configured to form a seal with the tooling surface 106 in response to the vacuum applied to the mandrel vacuum channel 108. For example, the vacuum evacuates the gas bound by the edge portion 116 of the vacuum-bag assembly 202, the mandrel 104, and the seals 138, thereby allowing atmospheric pressure to clamp the edge portion 116 of the vacuum-bag assembly 202 to the mandrel 104.

In one or more examples, the pair of seals 138 provide a redundancy in the perimeter vacuum chamber 206 that forms the vacuum seal 190 between the vacuum-bag assembly 202 and the mandrel 104, which further forms the perimeter of the vacuum chamber 184 that surrounds the composite layup 152 during processing. For example, the pair of seals 138 provide additional points of edge-sealing contact between the edge portion 116 of the vacuum-bag assembly 202 and the mandrel 104. In one or more examples, pressure intensification between the seals 138 and the seal grooves 136 creates a pressure intensifier in the region forming the perimeter vacuum chamber 206.

In one or more examples, the pair of seal grooves 136 prevents damage or wear to the tooling surface 106 of mandrel 104 at the sealing interface between the seals 138 and the mandrel 104 from degrading the effectiveness of the vacuum seal 190. For example, the pair of seal grooves 136 provides the sealing-interface surface for the pair of seals 138 that is less susceptible to damage or wear as compared to the remaining tooling surface 106 of the mandrel 104, which is supports the composite layup 152 and that is routinely cleaned after processing the composite layup 152.

In one or more examples, the stiffener 134 extends across the pair of seals 138. For example, the stiffener 134 is appropriately located on the edge portion 116 of the vacuum-bag assembly 202 such that the stiffener 134 extends across, or traverses, the pair of seals 138 to provide increased rigidity to at least a section of the edge portion 116 of the vacuum-bag assembly 202 that includes the pair of seals 138.

Referring to FIGS. 14-17 and 19, in one or more examples, the apparatus 100 includes a fastening device 140. The fastening device 140 is configured to apply a mechanical clamping force to the edge portion 116 of the vacuum-bag assembly 202 to hold the edge portion 116 of the vacuum-bag assembly 202 against the tooling surface 106 of the mandrel 104. For example, the edge portion 116 of the vacuum-bag assembly 202 is clamped between the fastening device 140 and the mandrel 104. The fastening device 140 includes any device or mechanism that is configured to apply the mechanical clamping force to the edge portion 116 of the vacuum-bag assembly 202.

Figure 14:
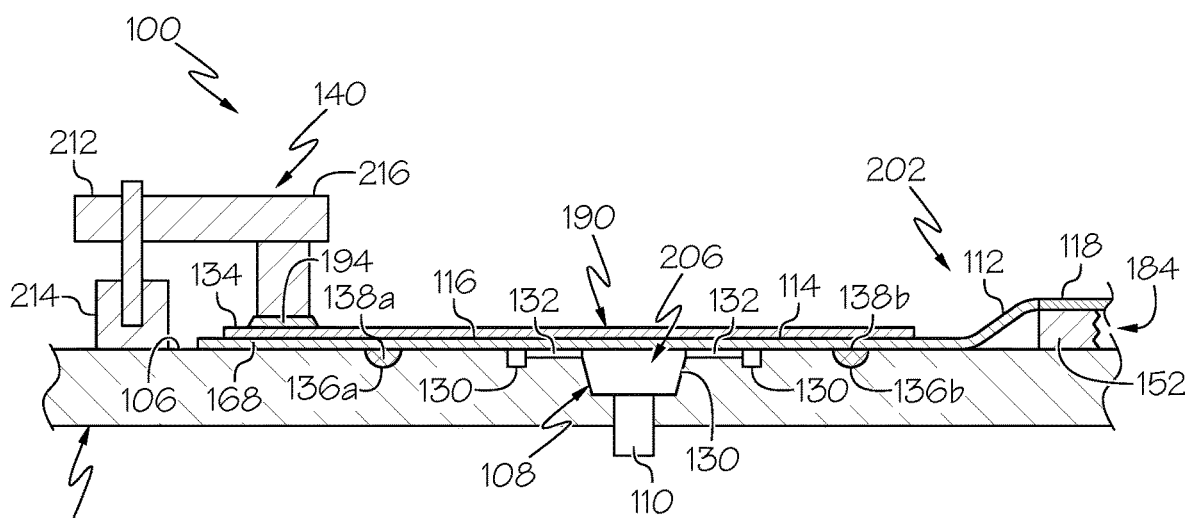
FIG. 14 is a schematic, sectional view of an example of a portion of the apparatus.
Figure 15:
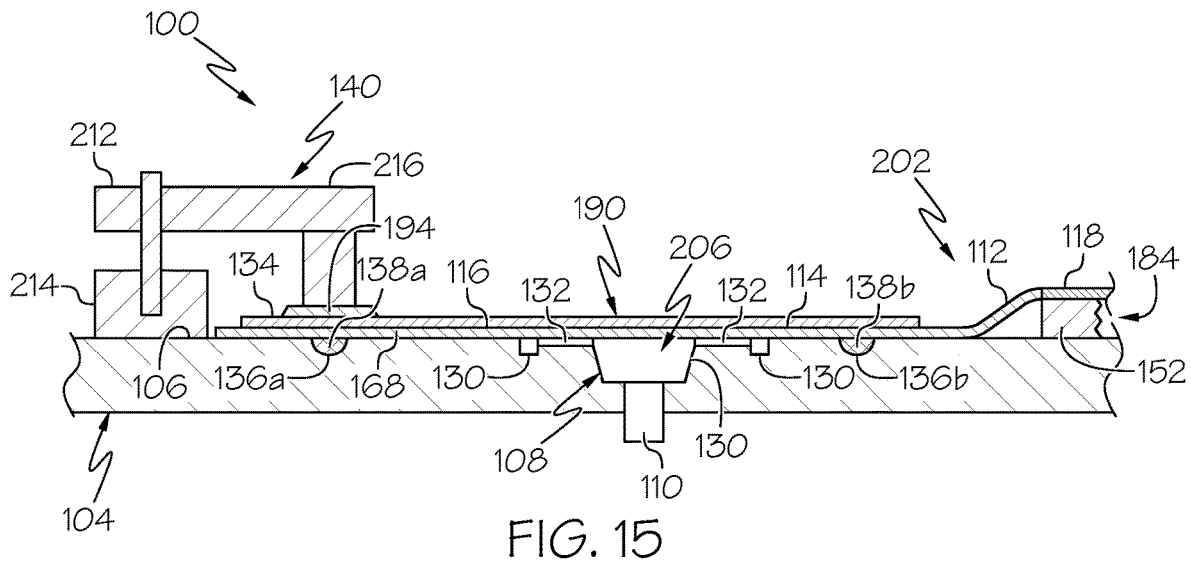
FIG. 15 is a schematic, sectional view of an example of a portion of the apparatus.
Figure 16:
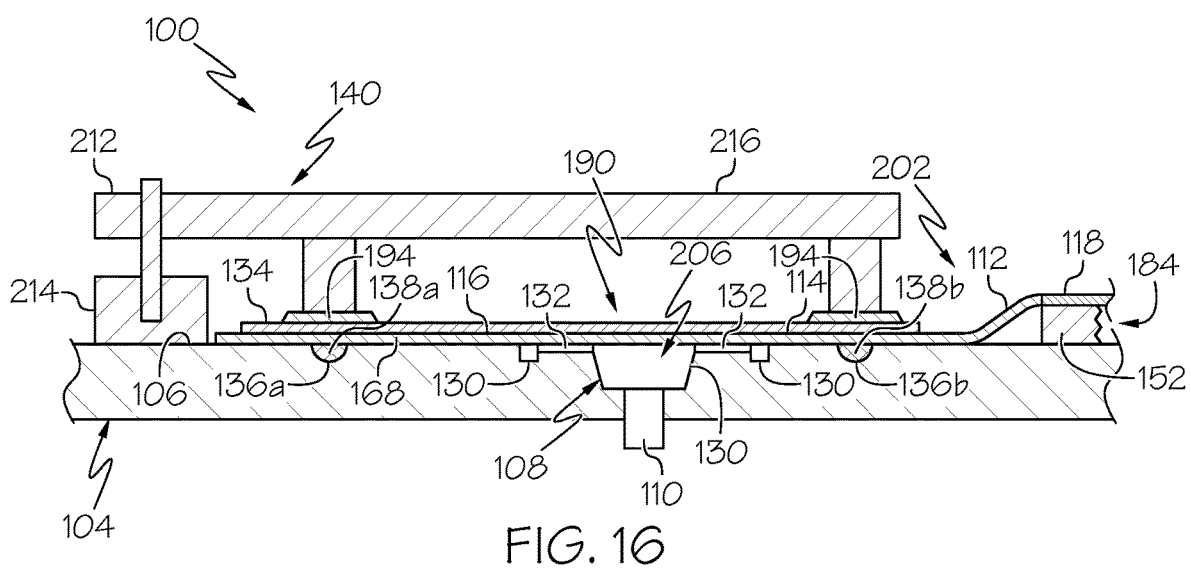
FIG. 16 is a schematic, sectional view of an example of a portion of the apparatus.
Figure 17:
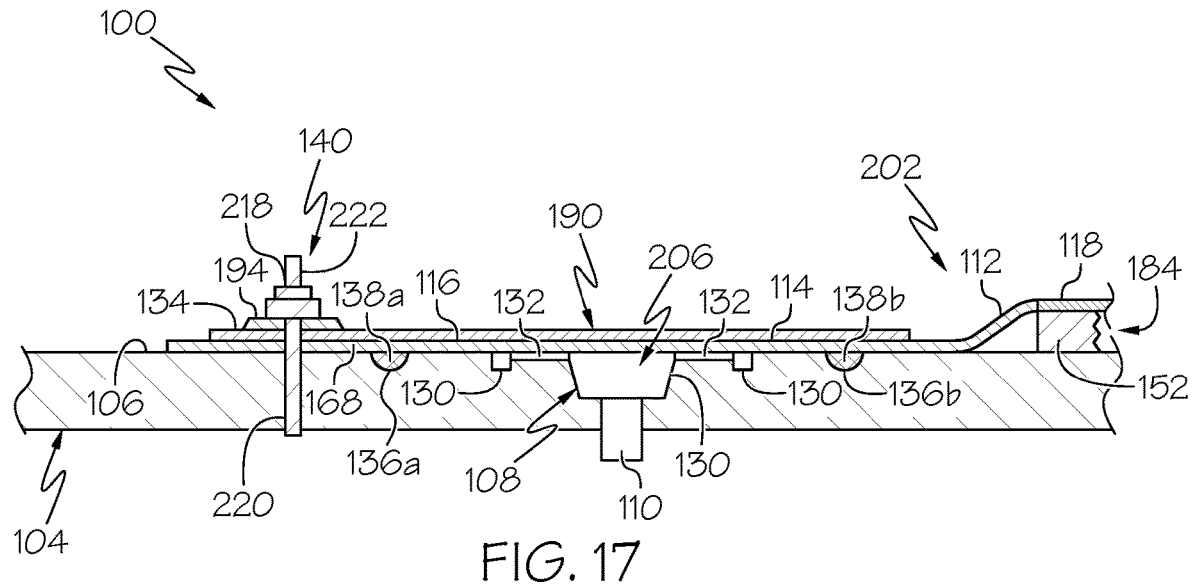
FIG. 17 is a schematic, sectional view of an example of a portion of the apparatus.
Figure 19:
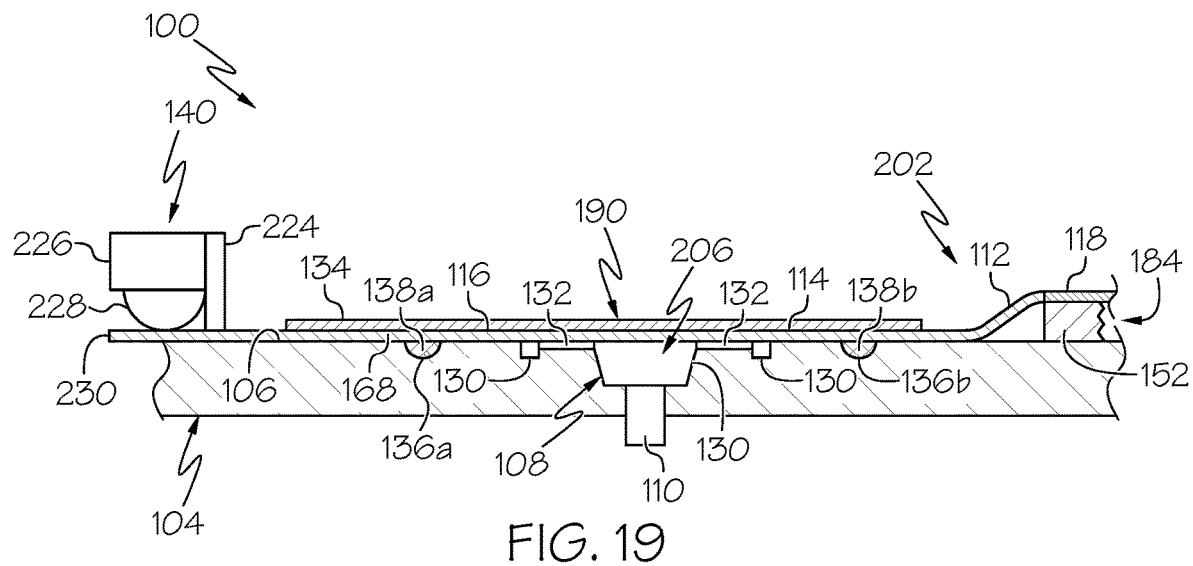
FIG. 19 is a schematic, sectional view of an example of a portion of the apparatus.

In one or more examples, the fastening device 140 is configured to apply the mechanical clamping force to the stiffener 134 to hold the edge portion 116 of the vacuum-bag assembly 202 against the tooling surface 106 of the mandrel 104. As illustrated in FIGS. 14 and 17, in one or more examples, the fastening device 140 is configured to engage the edge portion 116 of the vacuum-bag assembly 202 at a location that is spaced away from the first seal 138a. As illustrated in FIG. 15, in one or more examples, the fastening device 140 is configured to engage the stiffener 134 at a location that is over the first seal 138a. As illustrated in FIG. 16, in one or more examples, the fastening device 140 is configured to engage the stiffener 134 at locations that are over the first seal 138a and the second seal 138b. As illustrated in FIG. 19, in one or more examples, the fastening device 140 is configured to engage the edge portion 116 of the vacuum-bag assembly 202 beyond the stiffener 134.

In one or more examples, the fastening device 140 prevents the edge portion 116 of the vacuum-bag assembly 202 from peeling away from the tooling surface 106 of the mandrel 104 during processing of the composite layup 152, such as due to circulation of pressurized air within the processing equipment 192 (e.g., an autoclave). In one or more examples, the mechanical clamping force applied to the edge portion 116 of the vacuum-bag assembly 202 by the fastening device 140 is sufficient to form another edge seal between the vacuum-bag assembly 202 and the mandrel 104. In one or more examples, the fastening device 140 provides a redundancy in the perimeter vacuum chamber 206 that forms the vacuum seal 190 between the vacuum-bag assembly 202 and the mandrel 104.

Referring to FIGS. 14-16, in one or more examples, the fastening device 140 includes, or takes the form of, a mechanical clamp 212 that is configured to be manually or automatically actuated between a clamped state and unclamped state. In one or more examples, the mechanical clamp 212 includes a clamp arm 216 and a clamp actuator 214 that is coupled to the clamp arm 216. The clamp actuator 214 is configured to move the clamp arm 216 between the clamped state, in which the edge portion 116 of the vacuum-bag assembly 202 is clamped between the clamp arm 216 and the mandrel 104, and the unclamped state, in which the edge portion 116 of the vacuum-bag assembly 202 is released from between the clamp arm 216 and the mandrel 104.

Referring to FIG. 17, in one or more examples, the fastening device 140 includes a mechanical fastener 218 that is configured to secure the edge portion 116 of the vacuum-bag assembly 202 to the mandrel 104. In one or more examples, the mechanical fastener 218 includes a bolt 220 and a nut 222. In one or more examples, the bolt 220 is coupled to mandrel 104 and is configured to pass through the edge portion 116 of the vacuum-bag assembly 202. The nut 222 is configured to be threadably coupled to the bolt 220 between the clamped state, in which the edge portion 116 of the vacuum-bag assembly 202 is clamped between the nut 222 and the mandrel 104, and the unclamped state, in which the edge portion 116 of the vacuum-bag assembly 202 is released from between the nut 222 and the mandrel 104.

Referring to FIG. 19, in one or more examples, the fastening device 140 includes an pressurized clamp 224 that is configured to be actuated between the clamped state and unclamped state. In one or more examples, the pressurized clamp 224 includes an inflatable member 228 (e.g., a bulb) and a pressure source 226 that is in fluid communication with the inflatable member 228. The pressure source 226 is configured to inflate and pressurize the inflatable member 228 to move the clamp arm 216 to the clamped state, in which the edge portion 116 of the vacuum-bag assembly 202 is clamped between the inflatable member 228 and the mandrel 104. The pressure source 226 is configured to deflate and depressurize the inflatable member 228 to move the inflatable member 228 to the unclamped state, in which the edge portion 116 of the vacuum-bag assembly 202 is released from between the inflatable member 228 and the mandrel 104.

In one or more examples, the inflatable member 228 is configured to be pressurized to a pressure that is greater than the atmospheric pressure surrounding the vacuum-bag assembly 202. In one or more examples, during processing of the composite structure 102, pressure inside the processing equipment 192 (FIG. 1) may be increased to approximately 90 PSI. The inflatable member 228 is pressurized (e.g., inflated) such that it contacts the edge portion 116 of the vacuum-bag assembly 202 and applies a force of approximately 125 PSI to the vacuum-bag assembly 202 to clamp the vacuum-bag assembly 202 to the mandrel 104.

Referring to FIG. 14, in one or more examples, the fastening device 140 is configured to engage edge portion 116 of the vacuum-bag assembly 202, such as the stiffener 134, over the first seal 138a and the second seal 138b. In one or more examples, the clamp arm 216 is configured to traverse the pair of seals 138, the pair of grooves 136, and the mandrel vacuum channel 108.

Referring to FIGS. 14-17, in one or more examples, the vacuum-bag assembly 202 includes a pad up 194. The pad up 194 is located on the edge portion 116 of the vacuum-bag assembly 202. In one or more examples, the fastening device 140 is configured to contact and apply the force to the pad up 194. The pad up 194 protects the vacuum-bag assembly 202 from damage during clamping and provides a more evenly distributed clamping force applied to the edge portion 116 of the vacuum-bag assembly 202 by the fastening device 140.

In one or more examples, the pad up 194 is coupled to a surface of the elastomeric membrane 114 of the vacuum bagging 112 of the vacuum-bag assembly 202 opposite to the bagging surface 168 or to the stiffener 134. In one or more examples, the pad up 194 is integrated within the elastomeric membrane 114 of the vacuum bagging 112 of the vacuum-bag assembly 202, such as a thickened section of the elastomeric membrane 114. In one or more examples, the pad up 194 is integrated within the stiffener 134, such as a thickened section of the stiffener 134.

Figure 18:
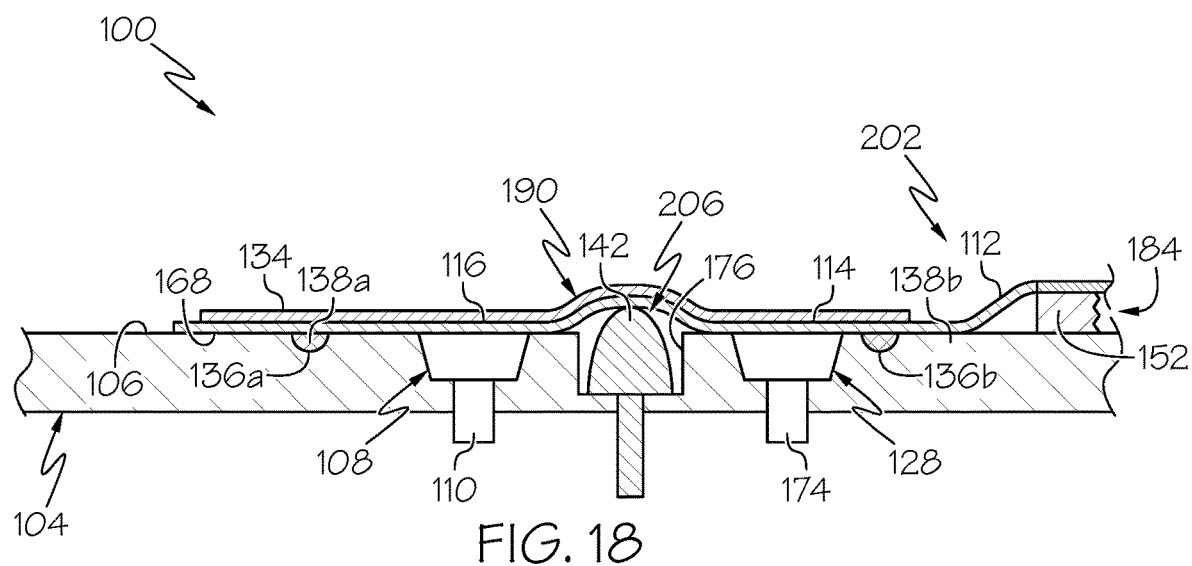
FIG. 18 is a schematic, sectional view of an example of a portion of the apparatus.

Referring to FIG. 18, in one or more examples, the mandrel 104 includes a second mandrel vacuum channel 128 formed in the tooling surface 106 and a second mandrel vacuum port 174 formed through the tooling surface 106. The second mandrel vacuum channel 128 is an example of the vacuum channel 158 (FIG. 1) and the second mandrel vacuum port 174 is an example of the vacuum port 160 (FIG. 1). While not explicitly illustrated, in one or more examples, at least one of the mandrel vacuum channel 108 and the second mandrel vacuum channel 128 includes the plurality of primary grooves 130 and the plurality of jumper grooves 132 (e.g., as shown in FIG. 10)

In one or more examples, the second mandrel vacuum channel 128 is spaced away from and runs alongside the mandrel vacuum channel 108. In one or more examples, the mandrel vacuum channel 108 and the second mandrel vacuum channel 128 are located between the pair of seal grooves 136 formed in the tooling surface 106. In one or more examples, the second mandrel vacuum channel 128 provides a redundancy in the perimeter vacuum chamber 206 that forms the vacuum seal 190 between the vacuum-bag assembly 202 and the mandrel 104. For example, the second mandrel vacuum channel 128 provides additional point of edge-sealing contact between the edge portion 116 of the vacuum-bag assembly 202 and the mandrel 104.

In one or more examples, the mandrel 104 also includes an inflatable seal 142. In one or more examples, the mandrel 104 includes a recess 176 and the inflatable seal 142 is located within the recess 176. In one or more examples, the inflatable seal 142 is located between the mandrel vacuum channel 108 and the second mandrel vacuum channel 128.

In one or more examples, the inflatable seal 142 is configured to be inflated and pressurized to apply a force against the bagging surface 168 of the edge portion 116 of the of the vacuum-bag assembly 202 (e.g., opposite to the stiffener 134) between the mandrel vacuum channel 108 and the second mandrel vacuum channel 128, while the vacuum is being applied to the mandrel vacuum channel 108 and the second mandrel vacuum channel 128. In one or more examples, the inflatable seal 142 provides another redundancy in the perimeter vacuum chamber 206 that forms vacuum seal 190 between the vacuum-bag assembly 202 and the mandrel 104. For example, the second mandrel vacuum channel 128 provides additional point of edge-sealing contact between the edge portion 116 of the vacuum-bag assembly 202 and inflatable seal 142.

In one or more examples, the inflatable seal 142 is configured to be inflated to a pressure that is less than the atmospheric pressure surrounding the vacuum bagging 112. In one or more examples, during processing of the composite structure 102, pressure inside the processing equipment 192 (FIG. 1) may be increased to approximately 90 PSI. The inflatable seal 142 is pressurized (e.g., inflated) such that it contacts the edge portion 116 of the vacuum-bag assembly 202 and applies a force of approximately 75 PSI to the bagging surface 168 that opposes the force applied by the atmosphere.

Referring to FIG. 19, in one or more examples, the vacuum-bag assembly 202 includes one seal 138 that is configured to contact the tooling surface 106 of the mandrel 104 adjacent to and alongside the mandrel vacuum channel 108. In these examples, the fastening device 140 is configured to apply the clamping force on the edge portion 116 of the vacuum-bag assembly 202 opposite the seal 138. In these examples, the perimeter vacuum chamber 206 includes a redundant outer edge-sealing boundary formed by the seal 138 and an edge 230 of the vacuum-bag assembly 202 clamped to the mandrel 104 by the fastening device 140.

In one or more examples, the mandrel 104 includes the seal groove 136 formed in the tooling surface 106. The seal groove 136 is located adjacent to and runs alongside the mandrel vacuum channel 108 opposite to the fastening device 140. The seal 138 is configured to be sealed within the seal groove 136 in response to the vacuum applied to the mandrel vacuum channel 108.

FIGS. 13-17 and 19 illustrate examples of the apparatus 100 in which the vacuum channel 158 and the vacuum port 160 (e.g., as shown in FIGS. 1 and 10) are located on the mandrel 104 (e.g., the mandrel 104 includes the mandrel vacuum channel 108 and the mandrel vacuum port 110). While not explicitly illustrated, in one or more examples of the apparatus 100, the vacuum channel 158 and the vacuum port 160 are located on the vacuum-bag assembly 202 (e.g., the vacuum-bag assembly 202 includes the bagging vacuum channel 162 and the bagging vacuum port 164 (e.g., as shown in FIGS. 3 and 5)). In these examples, the stiffener 134 is located across the bagging vacuum channel 162 formed in the bagging surface 168 of the edge portion 116 of the vacuum-bag assembly 202. For example, the stiffener 134 is appropriately located on the edge portion 116 of the vacuum-bag assembly 202 such that with the vacuum-bag assembly 202 applied over the composite layup 152, the stiffener 134 extends across, or traverses, the bagging vacuum channel 162. Additionally, in these examples, the pair of seals 138 is coupled to the bagging surface 168 of the vacuum-bag assembly 202 alongside the bagging vacuum channel 162. The bagging vacuum channel 162 is located between the pair of seals 138. For example, the first seal 138a is located along a first side of the bagging vacuum channel 162 and the second seal 138b is located along a second side of the bagging vacuum channel 162, opposite the first seal 138a.

Referring to FIGS. 6-8, in one or more examples, the vacuum-bag assembly 202 is configured to be wrapped around the mandrel 104 having the tubular shape (e.g., as shown in FIGS. 6 and 7). In these examples, the vacuum-bag assembly 202 includes the second caul 120 (e.g., as shown in FIGS. 6 and 8). The second caul 120 is connected to the caul 118 via the connection portion 240 of the vacuum bagging 112 (e.g., as shown in FIG. 8). The caul 118 (e.g., as shown in FIGS. 6 and 8) is configured to be applied to (e.g., for shaping and smoothing) a first portion of the composite layup 152 (FIG. 7), supported on the mandrel 104. The second caul 120 is configured to be applied to (e.g., for shaping and smoothing) a second portion of the composite layup 152. The second caul 120 may have any shape, dimensions, or complexity and may be made of any suitable material, such as the same material as the caul 118.

Referring to FIGS. 6 and 8, in one or more examples, when the vacuum-bag assembly 202 is wrapped circumferentially around the mandrel 104, the vacuum-bag assembly 202 is configured to be sealed to mandrel 104 along a first circumferential vacuum seal 190a (e.g., as shown in FIG. 6) in a hoop wise manner at the first mandrel-end 182 of the mandrel 104 and the vacuum-bag assembly 202 is configured to be sealed to mandrel 104 along a second circumferential vacuum seal 190b (e.g., as shown in FIG. 6) in a hoop wise manner at the second mandrel-end 186 of the mandrel 104.

In one or more examples, the vacuum-bag assembly 202 includes an extension portion 126 (e.g., as shown in FIGS. 6 and 8). The extension portion 126 of the vacuum-bag assembly 202 is formed from the vacuum bagging 112 (e.g., the elastomeric membrane 114) that extends from a portion of the perimeter edge 154 of the caul 118. When the vacuum-bag assembly 202 is wrapped circumferentially around the mandrel 104, the extension portion 126 of the vacuum-bag assembly 202 is configured to overlap and be sealed to another portion of the vacuum-bag assembly 202 (e.g., a portion of the second caul 120) along a longitudinal vacuum seal 190c, extending between the first mandrel-end 182 and the second mandrel-end 186. Accordingly, the sealed vacuum chamber 184 (FIG. 1) is formed around the composite layup 152 (FIGS. 1 and 7) and is bounded by the mandrel 104, the vacuum-bag assembly 202, the first circumferential vacuum seal 190a, the second circumferential vacuum seal 190b, and the longitudinal vacuum seal 190c.

Referring to FIG. 20, in one or more examples, the second caul 120 includes a coupling surface 122. A second surface interface 238 is formed between the second caul 120 and the extension portion 126 of the vacuum-bag assembly 202 when the extension portion 126 is placed over the second caul 120. The second surface interface 238 includes a second vacuum channel 124. In one or more examples, the second vacuum channel 124 is formed the coupling surface 122 of the second caul 120 (e.g., a caul vacuum channel). In one or more examples, the second vacuum channel 124 is formed in the bagging surface 168 of the extension portion 126 of the vacuum-bag assembly 202 (e.g., a second bagging vacuum channel).

In one or more examples, the second vacuum channel 124 has a configuration and function that is substantially like that of the vacuum channel 158 (FIGS. 1 and 8) and is configured to form the vacuum seal 190 (e.g., the longitudinal vacuum seal 190c) (FIG. 6) that joins the extension portion 126 of the vacuum-bag assembly 202 to the remainder of the vacuum-bag assembly 202. In one or more examples, the second vacuum channel 124 includes the plurality of primary grooves 130 and the plurality of jumper grooves 132 (e.g., as shown in FIG. 10), that serve as a breather system to help spread the vacuum.

In one or more examples, the extension portion 126 of the vacuum-bag assembly 202 is a section of the elastomeric membrane 114 of the vacuum bagging 112. In one or more examples, the extension portion 126 is configured to be sealed to the coupling surface 122 of the second caul 120 along the second vacuum channel 124 in response to a vacuum applied to the second vacuum channel 124. In one or more examples, with the extension portion 126 of the vacuum-bag assembly 202 positioned over the second caul 120 and the bagging surface 168 of the extension portion 126 in contact with the coupling surface 122 (e.g., as illustrated in FIG. 20), the second surface interface 238 between the bagging surface 168 and the coupling surface 122 forms the vacuum seal 190, or seal boundary, between the extension portion 126 of the vacuum-bag assembly 202 and the second caul 120 of the vacuum-bag assembly 202 along the second vacuum channel 124 in response to the vacuum applied to the second vacuum channel 124.

In one or more examples, the vacuum-bag assembly 202 is placed over the composite layup 152 and the mandrel 104 such that the caul 118 is positioned over a portion of the composite layup 152, the second caul 120 is positioned over another portion of the composite layup 152, and the extension portion 126 is draped over the coupling surface 122 of the second caul 120. A joint vacuum chamber 232 is formed between the second caul 120 and the extension portion 126 of the vacuum-bag assembly 202 by evacuating gas from within the second vacuum channel 124, thereby allowing atmospheric pressure to clamp the extension portion 126 of the vacuum-bag assembly 202 to the second caul 120.

Accordingly, the joints between the edge portion 116 of the vacuum-bag assembly 202 and the mandrel 104 formed by the first circumferential vacuum seal 190a and the second circumferential vacuum seal 190b (e.g., as shown in FIG. 6) are created by an associated perimeter vacuum chamber 206 (e.g., as shown in FIGS. 11-19) that is dedicated to sealing. The joint between the extension portion 126 of the vacuum-bag assembly 202 and the second caul 120 of the vacuum-bag assembly 202 formed by the longitudinal vacuum seal 190c (e.g., as shown in FIG. 6) is created by the joint vacuum chamber 232 (e.g., as shown in FIG. 20) that is dedicated to sealing. The sealed vacuum chamber 184 (e.g., as shown in FIGS. 1, 4, 5 and 11-20) that surrounds the composite layup 152 is separate from the perimeter vacuum chamber 206 and the joint vacuum chamber 232 and is dedicated to processing the composite layup 152.

In one or more examples (not explicitly illustrated), the vacuum-bag assembly 202 includes the second vacuum channel 124 (e.g., another bagging vacuum channel 162) and another bagging vacuum port 164 formed in the bagging surface 168 of the extension portion 126 of the vacuum-bag assembly 202. In these examples, the extension portion 126 of the vacuum-bag assembly 202 is configured to be sealed to the coupling surface 122 of the second caul 120 along the second vacuum channel 124 in response to the vacuum applied to the bagging vacuum channel 162. For example, with the extension portion 126 of the vacuum-bag assembly 202 positioned over the second caul 120 and the bagging surface 168 in contact with the coupling surface 122, the second surface interface 238 between the bagging surface 168 and the coupling surface 122 forms the vacuum seal 190, or seal boundary, between the vacuum-bag assembly 202 and the second caul 120 along the bagging vacuum channel 162 in response to the vacuum applied to the second vacuum channel 124. This arrangement may be advantageous because it enables the vacuum to be applied through the vacuum-bag assembly 202, rather than through the second caul 120.

In one or more examples, the vacuum-bag assembly 202 includes the stiffener 134 located on the extension portion 126 of the vacuum-bag assembly 202. In one or more examples, the second caul 120 includes the pair of seal grooves 136 and the vacuum bagging 112 includes the pair of seals 138 located on the extension portion 126 of the vacuum-bag assembly 202. The pair of seals 138 is configured to form an edge seal within the pair of seal grooves 136 in response to application of vacuum within the joint vacuum chamber 232.

Referring to FIGS. 6 and 8, in one or more examples, the vacuum-bag assembly 202 may be a single member that includes more than one caul (e.g., caul 118 and second caul 120) that are interconnected by the vacuum bagging 112 (e.g., elastomeric membrane 114). For example, the vacuum-bag assembly 202 may be wrapped around the mandrel 104 (e.g., as shown in FIG. 6) such that a first longitudinal edge 234 of the vacuum-bag assembly 202 overlaps a second longitudinal edge 236 of the vacuum-bag assembly 202 and such that the extension portion 126 of the vacuum-bag assembly 202 overlaps and is vacuum sealed to a portion of the second caul 120 as described above.

In one or more examples (not explicitly illustrated), the apparatus 100 includes a plurality of individual (discrete) vacuum-bag assemblies 202, each one of the vacuum-bag assemblies 202 including the caul 118 and the vacuum bagging 112 extending from at least a portion of the perimeter edge 154 of the caul 118. In these examples, the extension portion 126 of one of the vacuum-bag assemblies 202 is configured to overlap and be vacuum sealed to the caul 118 of the another one of the vacuum-bag assemblies 202, as described above.

In one or more examples, the vacuum-bag assembly 202 is configured to process the composite structure 102 taking the form of a full barrel section of an aircraft (e.g., as shown in FIG. 6), in which the vacuum-bag assembly 202 is approximately equal the longitudinal length of the mandrel 104, as described herein above.

In one or more examples (not explicitly illustrated), the vacuum-bag assembly 202 is configured to process the composite structure 102 taking the form of a half barrel fuselage section of an aircraft, for example, in which the vacuum seal 190 (e.g., as shown in FIGS. 4, 5 and 11-19) runs longitudinally along a longitudinal half barrel section edge.

In one or more examples (not explicitly illustrated), the vacuum-bag assembly 202 is configured to process the composite structure 102 taking the form of a full barrel section of an aircraft, for example, in which the vacuum seal 190 (e.g., another circumferential vacuum seal) runs in the hoop wise direction somewhere mid-span between the first mandrel-end 182 and the second mandrel-end 186 (FIG. 6) of the mandrel 104. Therefore, in one or more examples, the vacuum-bag assembly 202 is less than the longitudinal length of the mandrel 104, such as half or a third of the length of the mandrel 104, and then joined via a hoop wise joint, in which the vacuum seal 190 (e.g., as shown in FIG. 20) runs circumferentially to join the vacuum-bag assembly 202 to an adjacent vacuum-bag assembly 202.

In one or more examples, the vacuum-bag assembly 202 is configured to process the composite structure 102 taking the form of a panel and a stiffener (e.g., a hat stringer) coupled to a panel or another component having a closed cross-sectional shape with an open interior.

Referring to FIGS. 19 and 20, in one or more examples, the mandrel 104 includes a mandrel bladder 144. The mandrel bladder 144 is inflatable and is configured to be located within the open interior formed by the closed cross-sectional shape of the panel and the stiffener when pressurized (e.g., inflated). For example, the mandrel bladder 144 is located within a hollow space formed by the closed cross-sectional shape of the panel and the stiffener (e.g., within the hat stringer) to prevent the stiffener (e.g., stringer) from being crushed during processing. In one or more examples, the mandrel bladder 144 fits into each of the longitudinally running stringers. The mandrel bladder 144 is pressurized during processing of the composite layup 152 to help keep the hollow stringer (e.g., a hat stringer) preform from being crushed during processing.

In one or more examples, the mandrel 104 also includes a bladder vent aperture 146 that is formed in the mandrel bladder 144. The bladder vent aperture 146 enables the mandrel bladder 144 to be pressurized such that the mandrel bladder 144 fills the hollow space formed by the closed cross-sectional shape of the panel and the stiffener. In one or more examples, the mandrel bladder 144 is put in fluid communication with the pressurized atmosphere within the processing equipment 192 (FIG. 1) via the bladder vent aperture 146 to pressurize (e.g., inflate) the mandrel bladder 144 (e.g., is opened to the environment/atmosphere within the autoclave). In one or more examples, the mandrel manifold 188 (e.g., as shown in FIG. 7) is configured to route pressurized gas to the mandrel bladder 144 via the bladder vent aperture 146, such as from an external pressurization system.

Referring to FIG. 19, in one or more examples, the vacuum bagging 112 includes a vent fitting 148. The vent fitting 148 extends through the vacuum-bag assembly 202, such as through the elastomeric membrane 114 of the vacuum bagging 112. The vent fitting 148 is configured to be coupled to the bladder vent aperture 146 such that the mandrel bladder 144 is in fluid communication with atmosphere that is external to the vacuum-bag assembly 202, such as the atmosphere within the processing equipment 192 (FIG. 1) (e.g., an autoclave).

Referring to FIG. 20, in one or more examples, the mandrel 104 includes a mandrel vent aperture 150. The mandrel vent aperture 150 is in fluid communication with the bladder vent aperture 146. The vent fitting 148 is configured to extend through the mandrel vent aperture 150. The vent fitting 148 is also configured to be coupled to the bladder vent aperture 146 such that the mandrel bladder 144 is in fluid communication with atmosphere that is external to the mandrel 104, such as the atmosphere within the processing equipment 192 (FIG. 1) (e.g., an autoclave).

Figure 23:
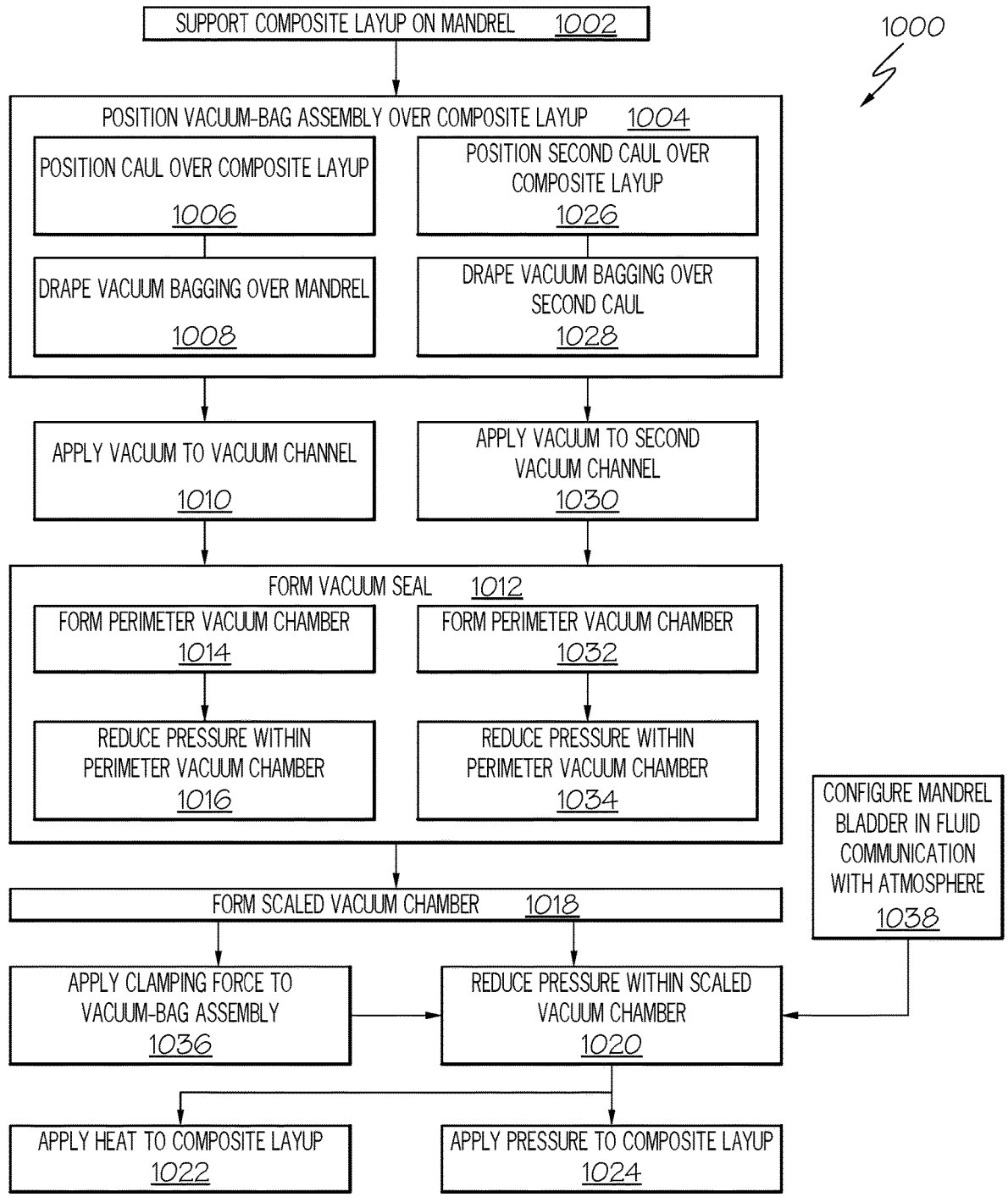
FIG. 23 is a flow diagram of an example of a method for processing a composite structure.

Also disclosed herein is a method 1000 for processing the composite structure 102 using the apparatus 100. Referring to FIG. 23, by way of examples, the present disclosure is also directed to a method 1000 for processing the composite structure 102. Referring generally to FIGS. 1-22, in one or more examples, implementation of the method 1000 is performed using the disclosed apparatus 100.

The processing may be performed according to the disclosed method 1000 including any suitable manufacturing process, in which heat, pressure, or a combination of heat and pressure is used to process the composite structure 102. In one or more examples, the method 1000 is drawn to a resin infusing process, in which the composite layup 152 is infused with a resin matrix under vacuum pressure. In one or more examples, the method 1000 is drawn to a compacting process, in which the composite layup 152 is compacted to remove trapped air. In one or more examples, the method 1000 is drawn to a debulking process, in which a thick composite layup 152 is compacted under moderate heat and pressure and/or vacuum to remove most of the air, to ensure seating on the tool, and to prevent wrinkles. In one or more examples, the method 1000 is drawn to a curing process, in which properties of a thermosetting resin are changed by chemical reaction under heat and pressure and/or vacuum.

In one or more examples, the method 1000 includes a step of (block 1002) supporting the composite layup 152 on the tooling surface 106 of the mandrel 104. Further, in one or more examples, the method 1000 includes a step of (block 1004) positioning the vacuum-bag assembly 202 over the composite layup 152.

In one or more examples, according to the method 1000, the step of (block 1004) positioning the vacuum-bag assembly 202 over the composite layup 152 includes a step of (block 1006) positioning the caul 118 of the vacuum-bag assembly 202, that is coupled to the vacuum bagging 112, over the composite layup 152.

In one or more examples, according to the method 1000, the step of (block 1004) positioning the vacuum-bag assembly 202 over the composite layup 152 includes a step of (block 1008) draping (e.g., applying) the vacuum bagging 112, extending from at least a portion of the perimeter edge 154 of the caul 118, over the mandrel 104. For example, the edge portion 116 of the vacuum-bag assembly 202 is draped over a portion of the tooling surface 106 of the mandrel 104 such that the vacuum channel 158 is between the bagging surface 168 of the edge portion 116 of the vacuum-bag assembly 202 and the tooling surface 106 of the mandrel 104.

In one or more examples, the caul 118 serves as the primary processing surface of the vacuum-bag assembly 202 that covers an entirety of the composite layup 152 and the vacuum bagging 112 is integrated with the caul 118 and extends from the perimeter edge 154 of the caul 118 to create a vacuum closeout while facilitating for drapability of the vacuum-bag assembly 202 (e.g., the vacuum bagging 112) over complex and/or dynamic features of the mandrel 104.

In one or more examples, according to the method 1000, the step of (block 1008) draping the vacuum bagging 112 over the mandrel 104 includes a step of placing the edge portion 116 of the vacuum-bag assembly 202 in contact with a portion of the tooling surface 106 over the mandrel vacuum channel 108 (e.g., as shown in FIGS. 4, 9 and 11-19), formed in the tooling surface 106.

In one or more examples, according to the method 1000, the step of (block 1008) draping the vacuum bagging 112 over the mandrel 104 includes a step of placing the edge portion 116 of the vacuum-bag assembly 202 that includes the bagging vacuum channel 162 (e.g., as shown in FIG. 5) in contact with a portion of the tooling surface 106 of the mandrel 104.

In one or more examples, the method 1000 includes a step of (block 1010) applying the vacuum to the vacuum channel 158. For example, the vacuum is applied to the vacuum channel 158 via the vacuum port 160 that is in fluid communication with the vacuum channel 158.

In one or more examples, according to the method 1000, the step of (block 1010) applying the vacuum to the vacuum channel 158 includes a step of applying the vacuum to the mandrel vacuum channel 108 via the mandrel vacuum port 110, formed in the tooling surface 106 and in fluid communication with the mandrel vacuum channel 108.

In one or more examples, according to the method 1000, the step of (block 1010) applying the vacuum to the vacuum channel 158 includes a step of applying the vacuum to the bagging vacuum channel 162 via the bagging vacuum port 164, formed in the bagging surface 168 and in fluid communication with the bagging vacuum channel 162.

In one or more examples, the method 1000 includes a step of (block 1012) forming the vacuum seal 190 between the vacuum bagging 112 and the mandrel 104. For example, the vacuum seal 190 is formed between the tooling surface 106 of the mandrel 104 and the bagging surface 168 of the vacuum bagging 112 and along the vacuum channel 158.

In one or more examples, the edge portion 116 of the vacuum-bag assembly 202 is vacuum sealed to the tooling surface 106 along the vacuum channel 158 via the vacuum applied to the vacuum channel 158 when the vacuum seal 190 is formed.

In one or more examples, according to the method 1000, the step of (block 1012) forming the vacuum seal 190 includes a step of sealing the edge portion 116 of the vacuum-bag assembly 202 of the vacuum bagging 112 to the tooling surface 106 along the mandrel vacuum channel 108 via the vacuum applied to the mandrel vacuum channel 108.

In one or more examples, according to the method 1000, the step of (block 1012) forming the vacuum seal 190 includes a step of sealing the edge portion 116 of the vacuum-bag assembly 202 of the vacuum bagging 112 to the tooling surface 106 along the bagging vacuum channel 162 via the vacuum applied to the bagging vacuum channel 162.

In one or more examples, according to the method 1000, the step of (block 1012) forming the vacuum seal 190 includes a step of (block 1014) forming the perimeter vacuum chamber 206 and a step of (block 1016) reducing pressure within the perimeter vacuum chamber 206 in response to the step of (block 1010) applying the vacuum to the vacuum channel 158. For example, the perimeter vacuum chamber 206 is formed by the tooling surface 106 of the mandrel 104, the bagging surface 168 of the vacuum bagging 112, and the vacuum channel 158. Reducing the pressure within the perimeter vacuum chamber 206 is achieved by evacuating gas from within the perimeter vacuum chamber 206 in response to applying the vacuum to the vacuum channel 158.

Accordingly, application of the vacuum to the vacuum channel 158 creates the perimeter vacuum chamber 206 (e.g., as shown in FIGS. 1, 4, 5 and 11-19) and evacuates gas from within the perimeter vacuum chamber 206. The reduction of pressure within the perimeter vacuum chamber 206 allows atmospheric pressure to clamp the edge portion 116 of the vacuum-bag assembly 202 and the mandrel 104 together and forms the vacuum seal 190 (e.g., as shown in FIGS. 1, 4, 5 and 11-19) between the edge portion 116 of the vacuum-bag assembly 202 and the mandrel 104.

In one or more examples, the method 1000 includes a step of (block 1018) forming the sealed vacuum chamber 184 that encloses the composite layup 152. The sealed vacuum chamber 184 is formed by the mandrel 104, the vacuum-bag assembly 202, and the vacuum seal 190. The perimeter vacuum chamber 206 and, thus, the vacuum seal 190, forms a portion of a perimeter boundary of the sealed vacuum chamber 184 that surrounds the composite layup 152. The sealed vacuum chamber 184 is fluidly isolated from the perimeter vacuum chamber 206.

In one or more examples, the method 1000 includes a step of (block 1020) reducing pressure within the sealed vacuum chamber 184 formed between the vacuum-bag assembly 202 and the mandrel 104. For example, reduction of pressure within the sealed vacuum chamber 184 is performed by evacuating the gas located within the sealed vacuum chamber 184 via the processing vacuum ports 180 formed in the mandrel 104.

In one or more examples, with the vacuum seal 190 formed and the pressure within the sealed vacuum chamber 184 reduced, the method 1000 includes a step of (block 1022) applying an elevated temperature to the composite layup 152. In one or more examples, with the vacuum seal 190 formed and the pressure within the sealed vacuum chamber 184 reduced, the method 1000 includes a step of applying an elevated pressure to the composite layup 152. In one or more examples, the method 1000 includes the step of (block 1022) applying the elevated temperature and the step of (block 1024) applying the elevated pressure. In one or more examples, application of heat and/or pressure is performed using the processing equipment 192 (e.g., an autoclave). For example, the temperature and/or pressure of the gas within the autoclave and surrounding the sealed vacuum chamber 184 is increased such that the vacuum-bag assembly 202 is pressed down on the composite layup 152.

In one or more examples, according to the method 1000, the step of (block 1024) applying the pressure to the composite layup 152 includes a step of applying pressure to the outer mold line 156 of the composite layup 152 using the caul 118 of the vacuum-bag assembly 202.

In one or more examples, according to the method 1000, the step of (block 1004) positioning the vacuum-bag assembly 202 over the composite layup 152 includes a step of (block 1026) positioning the second caul 120 of the vacuum-bag assembly 202 over the composite layup 152. For example, the caul 118 is positioned over a first portion of the composite layup 152 and the second caul 120 is positioned over a second portion of the composite layup 152.

In one or more examples, according to the method 1000, the step of (block 1004) positioning the vacuum-bag assembly 202 over the composite layup 152 includes a step of (block 1028) draping the vacuum bagging 112 of the vacuum-bag assembly 202, extending from a portion of the perimeter edge 154 of the caul 118, over a portion of the second caul 120. For example, the extension portion 126 of the vacuum-bag assembly 202 is draped over a portion of the coupling surface 122 of the second caul 120 such that the second vacuum channel 124 is between the bagging surface 168 of the extension portion 126 of the vacuum-bag assembly 202 and the coupling surface 122 of the second caul 120.

In one or more examples, the method 1000 includes a step of (block 1030) applying the vacuum to the second vacuum channel 124. For example, the vacuum is applied to the second vacuum channel 124 via a second vacuum port that is in fluid communication with the second vacuum channel 124.

In one or more examples, according to the method 1000, the step of (block 1012) forming the vacuum seal 190 includes a step of (block 1032) forming the joint vacuum chamber 232 and a step of (block 1034) reducing pressure within the joint vacuum chamber 232 in response to the step of (block 1030) applying the vacuum to the second vacuum channel 124. For example, the joint vacuum chamber 232 is formed by the coupling surface 122 of the second caul 120, the bagging surface 168 of the vacuum bagging 112 (e.g., the extension portion 126 of the vacuum-bag assembly 202), and the second vacuum channel 124. Reducing the pressure within the joint vacuum chamber 232 is achieved by evacuating gas from within the joint vacuum chamber 232 in response to applying the vacuum to the second vacuum channel 124.

Accordingly, application of the vacuum to the second vacuum channel 124 creates the joint vacuum chamber 232 (e.g., as shown in FIG. 20) and evacuates gas from within the joint vacuum chamber 232. The reduction of pressure within the joint vacuum chamber 232 allows atmospheric pressure to clamp the extension portion 126 of the vacuum-bag assembly 202 and the second caul 120 together and forms the vacuum seal 190 (e.g., as shown in FIG. 20) between the extension portion 126 of the vacuum-bag assembly 202 and the second caul 120. The sealed vacuum chamber 184 is formed by the mandrel 104, the vacuum-bag assembly 202, and the vacuum seal 190.

In one or more examples, according to the method 1000, the step of (block 1008) draping the vacuum bagging 112 over the mandrel 104 includes a step of mating and engaging the pair of seals 138, coupled to the edge portion 116 of the vacuum-bag assembly 202, with the pair of seal grooves 136, formed in the tooling surface 106 of the mandrel 104. In one or more examples, according to the method 1000, the step of (block 1012) forming the vacuum seal 190 includes a step sealing the pair of seals 138, coupled to the edge portion 116 of the vacuum-bag assembly 202, within the pair of seal grooves 136, formed in the tooling surface 106 of the mandrel 104.

In one or more examples, according to the method 1000, the step of (block 1028) draping the vacuum bagging 112 over the second caul 120 includes a step of mating and engaging the pair of seals 138, coupled to the extension portion 126 of the vacuum-bag assembly 202, with the pair of seal grooves 136, formed in the coupling surface 122 of the second caul 120. In one or more examples, according to the method 1000, the step of (block 1012) forming the vacuum seal 190 includes a step sealing the pair of seals 138, coupled to the extension portion 126 of the vacuum-bag assembly 202, within the pair of seal grooves 136, formed in the coupling surface 122 of the second caul 120.

In one or more examples, the method 1000 includes a step of (block 1036) applying the clamping force to the vacuum-bag assembly 202. For example, the clamping force is applied to the vacuum bagging 112 to hold the edge portion 116 of the vacuum-bag assembly 202 against the tooling surface 106 of the mandrel 104. In one or more examples, the clamping force is applied to the edge portion 116 of the vacuum-bag assembly 202 by the fastening device 140.

In one or more examples, the method 1000 includes a step of (block 1038) configuring the mandrel bladder 144 of the mandrel 104 in fluid communication with atmosphere that is external to the vacuum-bag assembly 202. For example, the mandrel bladder 144 is pressurized (e.g., inflated) to fill the hollow space formed by the closed cross-sectional shape of the panel and the stiffener.

Also disclosed herein is the composite structure 102 that is processed using the method 1000.

Figure 24:
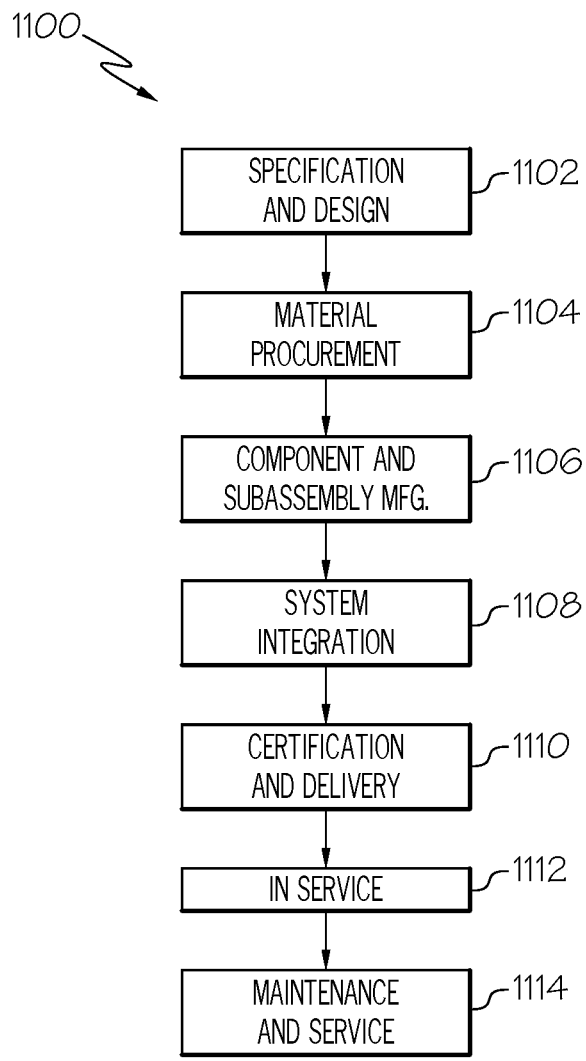
FIG. 24 is a flow diagram of an aircraft manufacturing and service methodology.
Figure 25:
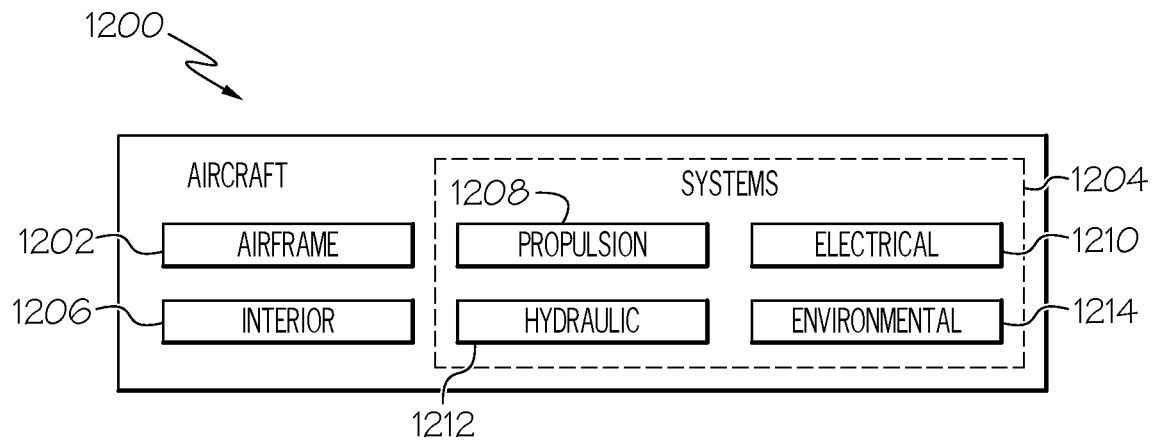
FIG. 25 is a schematic block diagram of an example of an aircraft.

Referring now to FIGS. 24 and 25, examples of the apparatus 100 and the method 1000 may be used in the context of an aircraft manufacturing and service method 1100, as shown in the flow diagram of FIG. 24 and the aircraft 1200, as schematically illustrated in FIG. 25.

Referring to FIG. 25, in one or more examples, the aircraft 1200 includes an airframe 1202 and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, and the like.

The composite structure 102 manufactured using the apparatus 100 or in accordance with the method 1000 may be any one of a structure, an assembly, a subassembly, a component, a part, or any other portion of the aircraft 1200, such as a portion of the airframe 1202, the interior 1206, and one or more of the high-level systems 1204. For example, the composite structure 102 may be any one of an aircraft spar, a wing section, a fuselage barrel section, an interior panel, an exterior skin panel, and the like.

Referring to FIG. 24, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 24 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the apparatus 100 and the method 1000 shown and described herein may be employed during any one or more of the stages of the manufacturing and service method 1100 shown in the flow diagram illustrated by FIG. 24. In an example, implementations of the disclosed apparatus 100 and method 1000 may form a portion of component and subassembly manufacturing (block 1106) and/or system integration (block 1108). For example, assembly of the aircraft 1200, the airframe 1202, and/or components thereof using implementations of the disclosed apparatus 100 and method 1000 may correspond to component and subassembly manufacturing (block 1106) and may be prepared in a manner similar to components or subassemblies prepared while the aircraft 1200 is in service (block 1112). Also, implementations of the disclosed apparatus 100 and method 1000 may be utilized during system integration (block 1108) and certification and delivery (block 1110). Similarly, implementations of the disclosed apparatus 100 and method 1000 may be utilized, for example and without limitation, while the aircraft 1200 is in service (block 1112) and during maintenance and service (block 1114).

Accordingly, referring to FIGS. 1-23, also disclosed is a method of fabricating a portion of the aircraft 1200 (FIG. 25) using the apparatus 100. Also disclosed is a portion of the aircraft 1200 manufactured in accordance with the method 1000.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite structures of other vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1 and 23, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-22 and 25, referred to above, need be included in every example and not all elements described herein are necessarily depicted in each illustrative example. Unless otherwise explicitly stated, the schematic illustrations of the examples depicted in FIGS. 1-22 and 25, referred to above, are not meant to imply structural limitations with respect to the illustrative example. Rather, although one illustrative structure is indicated, it is to be understood that the structure may be modified when appropriate.

In FIGS. 23 and 24, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 23 and 24 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the apparatus 100 and the method 1000 have been shown and described, modifications may occur to those skilled in the art upon reading the specification. The present application includes such modifications and is limited only by the scope of the claims.

What is claimed is:

1. A method of processing a composite structure, the method comprising:
   supporting a composite layup on a tooling surface of a mandrel;
   positioning a caul of a vacuum-bag assembly over the composite layup;
   draping an edge portion of vacuum bagging of the vacuum-bag assembly, extending from a perimeter edge of the caul, over a portion of the tooling surface;
   receiving a pair of seals, coupled to the edge portion of the vacuum bagging, in a pair of seal grooves, formed in the tooling surface alongside a vacuum channel, formed in at least one of the tooling surface of the mandrel and a bagging surface of the vacuum bagging;
   applying a vacuum to the vacuum channel;
   sealing the pair of seals within the pair of seal grooves in response to applying the vacuum;
   forming a vacuum seal between the tooling surface of the mandrel and the bagging surface of the vacuum bagging and along the vacuum channel; and
   forming a sealed vacuum chamber that encloses the composite layup with the mandrel, the vacuum-bag assembly, and the vacuum seal.

2. The method of claim 1, further comprising reducing a pressure within the sealed vacuum chamber.

3. The method of claim 2, further comprising, with the vacuum seal formed and the pressure within the sealed vacuum chamber reduced, applying at least one of an elevated temperature and an elevated pressure to the composite layup.

4. The method of claim 1, further comprising applying a clamping force to the vacuum bagging to hold an edge portion of the vacuum-bag assembly against the tooling surface of the mandrel.

5. An apparatus for processing a composite structure, the apparatus comprising:
   a mandrel comprising a tooling surface, configured to support a composite layup, and a pair of seal grooves, formed in the tooling surface;
   a vacuum-bag assembly configured to be placed over the mandrel and comprising:
      a caul, comprising a perimeter edge;
      vacuum bagging, extending from the perimeter edge of the caul and comprising a bagging surface; and
      a pair of seals coupled to an edge portion of the vacuum-bag assembly, formed by the vacuum bagging extending from at least a portion of the perimeter edge of the caul; and
   a vacuum channel formed in at least one of the tooling surface of the mandrel and the bagging surface of the vacuum bagging,
   wherein:
      a vacuum seal is formed between the vacuum bagging and the mandrel along the vacuum channel when the vacuum bagging is placed over the mandrel and a vacuum is applied to the vacuum channel;
      the mandrel, the vacuum-bag assembly, and the vacuum seal form a sealed vacuum chamber that encloses a composite layup;
      the pair of seal grooves is located alongside the vacuum channel such that the vacuum channel is located between the pair of seal grooves;
      the pair of seals is configured to be received within the pair of seal grooves when the edge portion of the vacuum-bag assembly is draped over the tooling surface of the mandrel; and
      the pair of seals is sealed with the pair of seal grooves in response to the vacuum applied to the vacuum channel.

6. The apparatus of claim 5, wherein the vacuum channel comprises:
   a plurality of primary grooves; and
   a plurality of jumper grooves extending between the plurality of primary grooves such that the plurality of primary grooves is in fluid communication with each other via the plurality of jumper grooves.

7. The apparatus of claim 1, wherein:
   a perimeter vacuum chamber is formed by the tooling surface, the bagging surface, and the vacuum channel;
   the vacuum is applied to the perimeter vacuum chamber via the vacuum channel to form the vacuum seal;
   the perimeter vacuum chamber forms a portion of a perimeter boundary of the sealed vacuum chamber; and
   the sealed vacuum chamber is fluidly isolated from the perimeter vacuum chamber.

8. The apparatus of claim 5, wherein:
   the tooling surface is configured to support a composite layup; and the caul comprises a caul surface that is configured to contact a surface of the composite layup, opposite the tooling surface.

9. The apparatus of claim 1, wherein the vacuum bagging forming at least the edge portion of the vacuum-bag assembly comprises an elastomeric membrane.

10. The apparatus of claim 1, wherein:
the vacuum-bag assembly further comprises a stiffener coupled to the edge portion; and
the stiffener is located across the vacuum channel and the pair of seals sealed with the pair of seal grooves when the edge portion of the vacuum-bag assembly is draped over the tooling surface of the mandrel.

11. The apparatus of claim 1, further comprising a fastening device configured to apply a clamping force to the edge portion of the vacuum-bag assembly to hold the vacuum-bag assembly against the tooling surface of the mandrel.

12. The apparatus of claim 11, wherein the fastening device is configured to engage the edge portion of the vacuum-bag assembly over at least one of the pair of seals.

13. The apparatus of claim 1, wherein:
the vacuum channel comprises:
a mandrel vacuum channel formed in the tooling surface; and
a second mandrel vacuum channel formed in the tooling surface and spaced away from the mandrel vacuum channel;
the mandrel vacuum channel and the second mandrel vacuum channel are located between the pair of seal grooves formed in the tooling surface;
the mandrel further comprises an inflatable seal located between the mandrel vacuum channel and the second mandrel vacuum channel; and
the inflatable seal is configured to be pressurized to apply a force against the edge portion of the vacuum-bag assembly when the vacuum is being applied to the mandrel vacuum channel and the second mandrel vacuum channel.

14. The apparatus of claim 5, wherein:
the vacuum-bag assembly further comprises:
a second caul coupled to the vacuum bagging and comprising a coupling surface;
an extension portion that is formed from the vacuum bagging extending from a portion of the perimeter edge of the caul; and
a second vacuum channel formed in at least one of the coupling surface of the second caul and the bagging surface of the extension portion of the vacuum-bag assembly; and
the extension portion of the of the vacuum-bag assembly is configured to be draped over a portion of the second caul and to be sealed to the second caul along the second vacuum channel in response to a vacuum applied to the second vacuum channel.

15. The apparatus of claim 5, wherein:
the mandrel further comprises a mandrel bladder and a bladder vent aperture formed in the mandrel bladder;
the vacuum-bag assembly further comprises a vent fitting that extends through the vacuum bagging; and
the vent fitting is configured to be coupled to the bladder vent aperture such that the mandrel bladder is in fluid communication with atmosphere that is external to the vacuum-bag assembly.

16. The apparatus of claim 5, wherein the mandrel further comprises:
a mandrel bladder;
a bladder vent aperture formed in the mandrel bladder;
a mandrel vent aperture in fluid communication with the bladder vent aperture; and
a vent fitting that is configured to extend through the mandrel vent aperture and to be coupled to the bladder vent aperture such that the mandrel bladder is in fluid communication with atmosphere that is external to the mandrel.

17. A mandrel for processing a composite structure, the mandrel comprising:
a tooling surface on which a composite layup is configured to be supported;
a mandrel vacuum channel formed in the tooling surface;
a pair of seal grooves formed in the tooling surface and located alongside the mandrel vacuum channel such that the mandrel vacuum channel is located between the pair of seal grooves,
wherein:
a vacuum seal is formed between the tooling surface and an edge portion of a vacuum-bag assembly, placed over the composite layup and the mandrel, in response to a vacuum applied to the mandrel vacuum channel;
the pair of seal grooves received a pair of seals, coupled to the edge portion of the vacuum-bag assembly, when the edge portion of the vacuum-bag assembly is draped over the tooling surface of the mandrel;
the pair of seal grooves is sealed with the pair of seals in response to the vacuum applied to the vacuum channel; and
a sealed vacuum chamber that encloses the composite layup is formed by the mandrel, the vacuum-bag assembly, and the vacuum seal.

18. An apparatus for processing a composite structure, the apparatus comprising:
a mandrel comprising a tooling surface, configured to support a composite layup;
a vacuum-bag assembly configured to be placed over the mandrel and comprising:
a caul, comprising a perimeter edge; and
vacuum bagging, extending from the perimeter edge of the caul and comprising a bagging surface;
a vacuum channel formed in at least one of the tooling surface of the mandrel and the bagging surface of the vacuum bagging;
a second caul coupled to the vacuum bagging and comprising a coupling surface;
an extension portion that is formed from the vacuum bagging extending from a portion of the perimeter edge of the caul; and
a second vacuum channel formed in at least one of the coupling surface of the second caul and the bagging surface of the extension portion of the vacuum-bag assembly;
wherein:
a vacuum seal is formed between the vacuum bagging and the mandrel along the vacuum channel when the vacuum bagging is placed over the mandrel and a vacuum is applied to the vacuum channel;
the mandrel, the vacuum-bag assembly, and the vacuum seal form a sealed vacuum chamber that encloses a composite layup; and
the extension portion of the of the vacuum-bag assembly is configured to be draped over a portion of the second caul and to be sealed to the second caul along the second vacuum channel in response to a vacuum applied to the second vacuum channel.

19. The apparatus of claim 18, wherein:
the tooling surface is configured to support a composite layup; and
the caul comprises a caul surface that is configured to contact a surface of the composite layup, opposite the tooling surface.

20. The apparatus of claim 18, wherein the vacuum bagging forming at least the edge portion of the vacuum-bag assembly comprises an elastomeric membrane.

\* \* \* \* \*